US007467236B2

(12) United States Patent
Saito et al.

(10) Patent No.: US 7,467,236 B2
(45) Date of Patent: Dec. 16, 2008

(54) CONTROL OF MULTIPLE PERIPHERALS

(75) Inventors: Masanori Saito, Nagano-ken (JP);
Jyunichi Takenuki, Nagano-ken (JP);
Hiraku Kanayama, Nagano-ken (JP)

(73) Assignee: Seiko Epson Corporated, Tokyo (JP)

( * ) Notice: Subject to any disclaimer, the term of this patent is extended or adjusted under 35 U.S.C. 154(b) by 735 days.

(21) Appl. No.: 10/927,895

(22) Filed: Aug. 27, 2004

(65) Prior Publication Data
US 2005/0097229 A1  May 5, 2005

(30) Foreign Application Priority Data
Sep. 1, 2003  (JP) ............................. 2003-309126

(51) Int. Cl.
*G06F 3/00* (2006.01)
(52) U.S. Cl. ................. 710/5; 710/8; 710/62; 710/104; 358/1.1; 358/1.05
(58) Field of Classification Search ............... 710/5–19, 710/62–63, 72–74, 104; 400/61–62; 358/1.1–1.5
See application file for complete search history.

(56) References Cited
U.S. PATENT DOCUMENTS

| | | | | |
|---|---|---|---|---|
| 5,604,843 | A * | 2/1997 | Shaw et al. ................... | 358/1.1 |
| 6,845,508 | B2 * | 1/2005 | Parry .......................... | 719/322 |
| 6,924,826 | B1 * | 8/2005 | Nakagiri et al. .............. | 715/700 |
| 6,965,958 | B1 * | 11/2005 | Sugiyama .................... | 710/104 |
| 6,976,101 | B2 * | 12/2005 | Terasaki et al. ............... | 710/65 |
| 7,232,267 | B2 * | 6/2007 | Uchida ........................ | 400/62 |
| 2002/0097432 | A1 * | 7/2002 | Kumashio .................. | 358/1.15 |
| 2002/0184304 | A1 * | 12/2002 | Meade et al. ................ | 709/203 |
| 2003/0161670 | A1 * | 8/2003 | Watanabe et al. ............. | 400/61 |
| 2004/0054983 | A1 * | 3/2004 | Noguchi ..................... | 717/100 |
| 2004/0057073 | A1 * | 3/2004 | Egawa et al. ................ | 358/1.15 |
| 2004/0212829 | A1 * | 10/2004 | Uchida ....................... | 358/1.15 |

FOREIGN PATENT DOCUMENTS

WO    WO 2004/021164 A1    3/2004

* cited by examiner

*Primary Examiner*—Christopher B Shin
(74) *Attorney, Agent, or Firm*—Martine Penilla & Gencarella, LLP

(57) ABSTRACT

When setting by means of a UI working conditions for a multiplicity of peripherals connected to a computer to control working of said peripherals, working environment data that identifies the working environment of the peripherals and dependency relationship data that indicates dependency relationships among said working conditions are stored in advance in a predetermined storage medium, the settable range data is referred to in order to acquire settable ranges for working conditions of the multiplicity of peripherals, settable ranges within which said multiplicity of peripherals are settable in the current working environment are all made decision branches without duplication, and peripherals are driven with settings made on the basis of this display.

3 Claims, 9 Drawing Sheets

15d stylized print data designation: postcard back face(photograph)

ink used : 1 (color)

print medium size : 2 (postcard)

designation: A4 borderless

Printer DB printer name: PM-**** driver version: 5.3e ink set: pigment, CMYKlclmG dependency relationship target item 1, 2, superordinate item 1, superordinate item 2

⋮ target item n, 1, superordinate item n1, superordinate item nm settable range target item x, 1, superordinate item x1 = 1, 1, 2

CONTROL OF MULTIPLE PERIPHERALS

BACKGROUND OF THE INVENTION

1. Field of the Invention

The present invention relates to working condition settings and control of peripheral devices.

2. Description of the Related Art

Ordinarily, a control program referred to as a driver is utilized to drive a printing device or other computer peripheral. In a driver, working condition settings for driving a peripheral are received, and the peripheral is driven in accordance with these settings. Typically, a UI (User Interface) is displayed on a display or the like, and working condition settings are made by the user through this UI.

With a UI of the kind described above, if complex settings are being made, a complicated setting operation will be required of the user, making the UI difficult to understand, particularly for a novice user. In situations such as one where several printing devices are connected to a computer, with multi-copy printing being distributed among these, making a series of settings in order to control multiple peripherals results in a UI that is exceedingly difficult to understand. However, with conventional UIs, it was not possible to make settings for multiple peripherals, by means of a single UI setting.

SUMMARY OF THE INVENTION

With the foregoing in view, it is an object of present invention to provide a technique for controlling multiple peripherals, whereby setting for a multitude of peripherals may be completed by means of a simple setting.

In order to achieve the aforementioned object according to the present invention, dependency relationship data and settable range data are stored in advance in a predetermined storage medium, and by referring to these sets of data, in the event that there is a working condition whose settable range varies in a manner dependent on a change in a certain working condition, the UI display takes place in such a way that the working condition is set, while accurately corresponding with variation in the settable range. Here, settable range data is stored for each individual peripheral working environment, and presents all settable ranges settable for a multiplicity of peripherals in the current working environment as decision branches, while eliminating duplication. When a change in a working condition setting made from the UI causes variation in the settable range for another working condition, reference is made to the settable range data, and a varying settable range is acquired.

That is, in the UI, the range included in any settable range for the multiplicity of peripherals is a decision branch. If a settable range is shared by a multiplicity of peripherals, it will be displayed as a decision branch, with duplication eliminated. As a result, all ranges settable in the current working environment are displayed on the UI. On the other hand, if a settable range varies due to a change in a working condition setting, the UI will be updated to reflect the variation, by means of a working condition updating step. Accordingly, working conditions settable under the current working environment are constantly presented as decision branches, and it is possible, when a desired working condition is selected and setting thereof completed, to reliably establish it as a settable working condition for any of the peripherals.

Since peripherals workable under working conditions set from the UI are the drive targets, in the event that there are a multiplicity of peripherals workable under a given set working condition, settings for the multiplicity of peripheral may be completed by means of a simple setting only. By means of this, it becomes possible to drive a multiplicity of peripherals, according to settings made by means of a simple setting only. Even in the absence of a multiplicity of peripherals workable under a set working condition, if at least one device is present, proper driving of the peripheral is assured.

Typically, settings for a peripheral are made on driver software; in the present invention, however, reference is made to settable range data in the working condition input-output step and working condition update step to receive settings by the UI and to update the UI, whereby the data required for UI display can be acquired without making any actual driver settings. That is, setting of settings selected on the UI can proceed while storing settings on a provisional basis, without actually setting the driver.

Accordingly, the UI can be displayed without actually setting a working condition for a driver or the like that controls drive of a peripheral, and without performing a process to ascertain working conditions settable for other working conditions at this setting, where the proper settable range for a setting input to the UI can be varied. Since settable range data and dependency relationship data needed for UI display are stored in a predetermined storage medium, for UI display it is sufficient to refer to these sets of data only, making it possible to realize faster UI display, as compared to the case where actually settings are made in driver software and settable ranges are acquired. In the peripheral control step, actual settings are made and peripherals are driven, and thus the step may consist of a driver.

In the working condition input-output step and working condition update step, UI display and updating can be carried out as long as it is possible to refer to the aforementioned dependency relationship data and settable range data, whereby even if the format of condition settings for drivers that control peripheral differ for individual OS, there is no need to follow that format. Thus, it is possible to present a universal UI controller that is not subject to restrictions as to format imposed by an individual OS.

Additionally, even in the event that, for example, new functionality is added by a version upgrade of a driver that controls a peripheral, thereby requiring a change in an aforementioned dependency relationship or settable range, it is possible to carry out the proper UI display simply by updating the aforementioned dependency relationship data and settable range data in the predetermined storage medium, so that the display can easily be made to correspond with version upgrades.

The aforementioned working conditions are various conditions that require setting when driving a peripheral, and should be set by means of manual selection by the user when driving a peripheral or by automatic settings made by the computer. Examples are print resolution of the printer, or printing medium type and size. For virtually all working conditions, there is a certain extent of latitude in selection, this latitude representing the settable range. The working environment includes the conditions in which a peripheral is placed, peripheral equipment and hardware, and the like, and should be identified objectively from the condition of the peripheral or computer, prior to driving of the peripheral.

In a multiplicity of working conditions, there are complicated interdependencies among working conditions, but since these dependency relationships are described in advance by dependency relationship data, in the event that there is a change in a setting for a particular working condition, it is possible to refer to this dependency relationship data to ascertain any variation in the settable range for the working condition, and to acquire a settable range on the basis of complex dependency relationships. Of course, since dependency relationships can vary depending on the working environment of a peripheral, the working environment of a peripheral is described in the dependency relationship data and the settable range data. By means of this, it is possible to ascertain which set of data should be referred to in any working environment.

Here, a peripheral may be consist of any device connectable to and workable by a computer; various kinds of devices fall under such peripherals. For example, an output device such as a printer, display or projector connected to a computer to carry out image output operations, an input device such as a scanner or digital camera connected to a computer to carry out image input operations, a recording device such as a hard disk drive connected to a computer to carry out data recording operations, or various other devices could serve as peripherals.

In dependency relationship data, for a given working environment, it is sufficient for there to be identified, for instances in which a different setting of a specific working condition is associated with variation in the range of settable settings for other working conditions, the working conditions for which this dependency relationship exists. That is, by ascertaining dependency relationships among working conditions by means of this dependency relationship data, it is possible to acquire a settable range for a working condition that exists in a dependency relationship, thereby preventing execution of a process to acquire settable ranges for working conditions having no dependency relationship, so that settable range data can be created with the minimum processing steps required.

Further, it is sufficient for settable range data to be useable when displaying a UI for setting working conditions for a peripheral in a given working environment, and to be able to display a setting range settable for each working condition. Of course, where there exists a dependency relationship between a certain working condition and other working conditions, the settable range data will be composed of data specifying a setting of a specific working condition, and data specifying settable ranges for other working conditions at that setting. Here, while the term working condition setting is used, it is sufficient for the value thereof to correspond in some manner to the condition, and is not limited to a numeric value. That is, instances where a working condition is specified by a text string are included. However, an arrangement whereby conditions in a device handled by a computer are associated with numeric values, with working conditions being specified by means of numeric values, is preferred. For data whose settable range is described by a text string, when displaying the decision branch of the working condition on the UI, it is possible to modify the text string on the UI by means of variation of the settable range.

Since it is sufficient for the settable range data memory to be storeable in a predetermined memory medium, it is not imperative that settable range data be already stored therein. That is, if settable range data is not stored, the settable range acquirer will acquire a settable range on the assumption that settable range data containing working environment data that matches the current working environment of the peripheral has been recorded. Of course, where [settable range data] is already stored, it is sufficient to decide whether the working environment data of the already stored settable range data matches the current working environment of the peripheral.

It is sufficient for working environment to identify the working environment of a peripheral, and it may describe data indicating the conditions in which the peripheral is placed, peripheral equipment and hardware, and the like. Various working environments may be employed. For example, as peripheral equipment, data indicating the model of the peripheral could be employed as working environment data. That is, where there are different models of a peripheral, dependency relationships with other working conditions and settable ranges therefor may differ, so by means of describing working environment data indicating the model of a peripheral in the dependency relationship data or settable range data, it becomes possible in the settable range acquiring step to create settable range data on a model-by-model basis. By recording this data as some of the settable range data, it becomes possible to identify a settable range for each of a multiplicity of peripherals.

Conditions in which the peripheral is placed could include, for example, whether there is an update available for the driver which control drive of the peripheral, locale information for the computer, and the like. That is, version upgrades of drivers are sometimes made in order to improve functionality or debug. It is possible that working condition dependency relationships and settable ranges may change with a version upgrade. It is possible to employ, by way of working environment data, data indicating whether a driver update is available, for example, data indicating the driver version. As a result, it becomes possible in the settable range acquiring step to create settable range data on an individual driver basis.

The use of data indicating a locale for the computer as working environment data takes into consideration the fact that settable range data is used on a given computer. Specifically, locale information includes information indicating the country where the computer is used, language, and the like; where locale information differs, text strings displayed on the UI will differ as well. Accordingly, by using locale information as working environment data, it becomes possible to create different settable range data in the event of different locale information. As a result, in the event that the default language setting of the computer is modified, it is possible to create settable range data corresponding to the selected language, and to refer to appropriate settable range data corresponding to that language on the UI.

Additionally, data indicating peripheral equipment and hardware could include data indicating components of a peripheral. For example, in the case of a printer, where the ink is replaced or an accessory such as a cutter is installed, or in the case of a scanner, where a light source component is replaced, or a transparent original scan unit is installed or deinstalled, dependency relationships and settable ranges can vary as a result. By employing data indicating peripheral components as working environment data, it becomes possible, in the event of different components of a peripheral, to acquire settable range data on a per-component basis in the settable range acquiring step.

Various arrangements may be employed in the working condition input-output step to ascertain current working environment, it being possible to employ various arrangements, such as communicating with a peripheral to acquire data that indicates the model and components of the peripheral, or in accordance with user input acquiring data that indicates the model and components of a peripheral. Of course, in a computer, a driver of the kind described previously is utilized in order to drive a peripheral, and since the driver corresponds to a particular model of peripheral, there can be employed an arrangement whereby data indicating the model is stored as data for use by the driver, and in response to a query as to the model, [the driver] refers to the data, and returns the name of the model.

In a similar arrangement, an arrangement whereby the version of the driver is returned could be employed as well. That is, arrangement whereby data indicating the version of the driver is stored in memory, and the data referred to in response to a query. Additionally, while it is typical for the aforementioned locale information to be set in the OS, it is possible to employ an arrangement whereby reference is made to the OS settings, or reference is made to locale information recorded by the OS in a predetermined storage medium, to acquire the locale information.

Additionally, it is possible to employ an arrangement whereby settings can be made from a simple UI when carrying out stylized operations on a multiplicity of peripherals. For this purpose, stylized working data for carrying out a multiplicity of stylized operations, together with the working environment data, is stored in advance in a predetermined storage medium, and possible stylized operation selections are displayed on the UI, on the basis of this data. Here, working environment data consists of data as described previously; in the present invention, since this stylized working data is defined together with the working environment data, it is possible to extract stylized working data appropriate for the particular working environment. Also, since the model of a peripheral is specifiable by working environment data, it is possible to extract a stylized operation corresponding to the model of a peripheral connected to the computer.

Additionally, it is possible for the UI to display, in the form of decision branches, all of the possible stylized operation selections (excluding duplicates) enabled in the current working environment of a plurality of peripherals, these being displayed for a predetermined output device or devices, whereby it becomes possible at any time to select any stylized operation enabled in the current working environment. Further, since in the peripheral control step there are driven peripherals enabled for these stylized operations, where a given stylized operation can be performed by a multiplicity of peripherals, it is possible for the stylized operation to be executed in parallel by different peripherals, so that the operation may be completed faster than it would be if the stylized operation were carried out by a single device. Since at least one peripheral capable of carrying out the stylized operation is present, proper execution of the stylized operation may be assured.

Here as well, various devices such as those mentioned previously may be employed as peripherals. It is acceptable for a stylized operation to be an operation for achieving a predetermined purpose in a peripheral, and various methods of deciding this may be employed. For example, an arrangement whereby the specifics and purpose of a stylized operation are specified by determining working conditions for carrying out a stylized operation, or whereby the specifics and purpose of a stylized operation are specified by sensory description, are possible. More specifically, in a printing device, stylized printing could be specified by printing conditions such as paper size, paper type and printing speed "A4, plain paper, (fast)"; or stylized printing could be specified by a sensory description such as "highest quality" or "very pretty", or by any of various other arrangements. Of course, in other types of peripherals, it would be possible to employ any of various other arrangements, such as, in the case of a projector, stylized operations according to the size of the presentation hall, or the type of image being projected.

It is sufficient for stylized working data to consist of data specifying working conditions for carrying out stylized operations of various kinds in a peripheral; a minimum set of working conditions needed to carry out a stylized operation may be specified, or all working conditions needed to carry out a stylized operation may be specified. In order to carry out the stylized operation of the preceding example, namely, "A4, plain paper, (fast)," the minimum set of working conditions needing to be set as print conditions would be the printer paper size, type of printer paper, and the "fast" print setting from among the possible print speeds for that size and type. Where all working conditions needed to carry out a stylized operation are specified, margin settings on the printer paper, the presence of any graphics processing, and the like may be specified additionally.

If, as in the former instance, a minimum set of working conditions needed to carry out a stylized operation is specified, it is preferable that other working conditions needed for driving the peripheral be set automatically. In this case, for example, settable range data indicating a settable range of the kind described previously is stored in memory, and precedence is determined in advance for values of items within the settable range. Next, settings within the aforementioned settable range are determined according to this order of precedence, and the peripheral is then driven under working conditions indicated by these settings and the settings of the aforementioned stylized working data.

It is acceptable in the stylized working designation receiving step to be able to refer to the aforementioned multiple sets of stylized working data, to display on the UI those stylized operations enabled in the current working environment as potential candidate stylized operations, and to receive an instruction regarding same; any of various arrangements are possible. Here, it is sufficient to provide an interface for displaying the UI and handling stylized operation instructions, for example, an arrangement whereby working condition decision branches are displayed on a predetermined output device such as a display, with the user being able to input desired settings using an input device such as a keyboard or mouse. When extracting potential working condition candidates, it is acceptable to make reference to working environment data to decide whether there is a match with current working environment, and refer to matching working environment data. As a result, multiple sets of stylized working data describing working environment for a multiplicity of peripherals can be extracted for presentation as stylized working candidates.

It is sufficient for the stylized working designation receiving step to be able to receive a stylized operation, and in the peripheral controlling step to be able to carry out the received stylized operation; for this purpose, it is preferable to employ an arrangement wherein settings for working conditions indicated by the stylized working data are stored in memory, and actual setting of the peripheral driver or the like made during actual driving of the peripheral. That is, even where a stylized operation is carried out, settings can be held as provisional settings until all required working condition settings have been determined, and set in the driver one all of the settings have been determined, thereby reducing the frequency of data exchange with the driver and holding down processing time.

Establishing such settings as provision setting is particularly preferable for carrying out processing in cases where stylized working data is data specifying the minimum set of working conditions required to carry out a stylized operation, with other settings needed to drive a peripheral being set according to an order of precedence. As a result, a single final exchange of data with the driver suffices, and settings can be completed rapidly. Here as well, working condition settings are not limited to numeric values.

Here as well, there may be employed an arrangement wherein dependency relationship data and settable range data are stored in advance in a predetermined storage medium, and wherein using an arrangement comprising a working condition input-output step and a working condition update step, conditions for desired working conditions can be set once a stylized operation has been selected. At this time, the working condition input-output step performs display of an appropriate settable range on the basis of the settable range data, and settable ranges for working conditions having dependency relationships are updated in the working condition update step.

The order of precedence can be determined by means of various criteria. For example, where a working condition setting is represented by a numeric value, the order of precedence may be determined in ascending order or descending order of the numeric value, or may be determined by means of function realized by the peripheral. For example, by way of an example of determining order of precedence according to function realized by a peripheral, there could be employed the operating speed of the peripheral, quality of a function obtained by means of the peripheral, or the like. The former would be equivalent to determining in the order of printing speed in the case of a printing device, or scanning speed in the case of a scanner; the latter would be equivalent to determining in the order of resolution or type of graphics processing in the case of a printing device, or image resolution in the case of a scanner. In either case, by determining an order of precedence in advance, working conditions can be determined readily. Of course, an order of precedence may be determined in advance for each stylized operation, or order of precedence may vary on an individual stylized operation basis.

By means of arrangements such as those described hereinabove, it is possible to readily select setting for realizing a stylized operation, even where the stylized operation is specified in terms of sensory description as described previously. For example, in order to realize a "very pretty" stylized operation, by assigning higher precedence to working conditions that give higher picture quality and selecting working conditions within the settable range in this order of precedence, it is possible to obtain the best picture quality result possible with the peripheral to realize a "very pretty" stylized operation.

As a further example of suitable implementation of the invention, there may be employed an arrangement wherein the invention is worked in a case of multi-copy printing in a printing device. Specifically, in control of a peripheral consisting of a printing device, when an instruction to execute multi-copy printing is received, working condition settings or a stylized operation instruction for carrying out such printing is received by the UI. At this time, print data for executing printing of a target for printing unit copies is created and sent to a printing device able to carry out the received settings or stylized operation, to carry out printing of the specified copies.

Where the aforementioned received settings or stylized operation can be carried out by a multiplicity of peripherals, multi-copy printing may be carried out in parallel by several printing devices. As a result, printing of multiple copies can be completed sooner that is the case where printing is carried out by a single printing device. Of course, where the aforementioned received settings or stylized operation can be carried out by a single printing device, while it will not be possible to reduce the time required for processing, with the arrangements pertaining to the present invention, it will nevertheless be possible to reliably carry out multi-copy printing.

When transferring print data to several printing devices, the number of iterations of data transfer may equal the number of copies specified, or where printing of multiple copies is to be carried out by predetermined printing devices, a command to carry out multi-copy printing may be appended to data transferred a single time, various arrangements being possible. Also, in multi-copy printing, the same text, image, or other target for printing may be printed in multiple copies, or different targets for printing may be printed multiple times, there being no particular limitation as to target.

The invention is not necessarily limited to a method for [presenting] settable ranges for a multiplicity of peripherals as decision branches in the manner described above, and may also be reduced to practice as a device invention. The concept of the invention encompasses any of a number of various modes, such as instances where the peripheral control device exists independently, or used in a form incorporated into a certain device. Various appropriate modifications, such as the choice of hardware or software, are possible as well.

Where the concept of the invention is embodied by way of example in software for a peripheral control device, the software will also correspond to the invention. Of course, the storage medium may consist of a magnetic storage medium or magnetooptical storage medium; any storage medium developed in the future could be considered completely analogously. Any reproduction stage, whether it be a primary reproduction, secondary reproduction, or the like, is also equivalent without any doubt whatsoever.

BRIEF DESCRIPTION OF THE DRAWINGS

FIG. 3 is an illustration showing a printer DB data description example.

DETAILED DESCRIPTION

The following description of the embodiments of the invention will be made according to the order indicated below.

Figure 1:
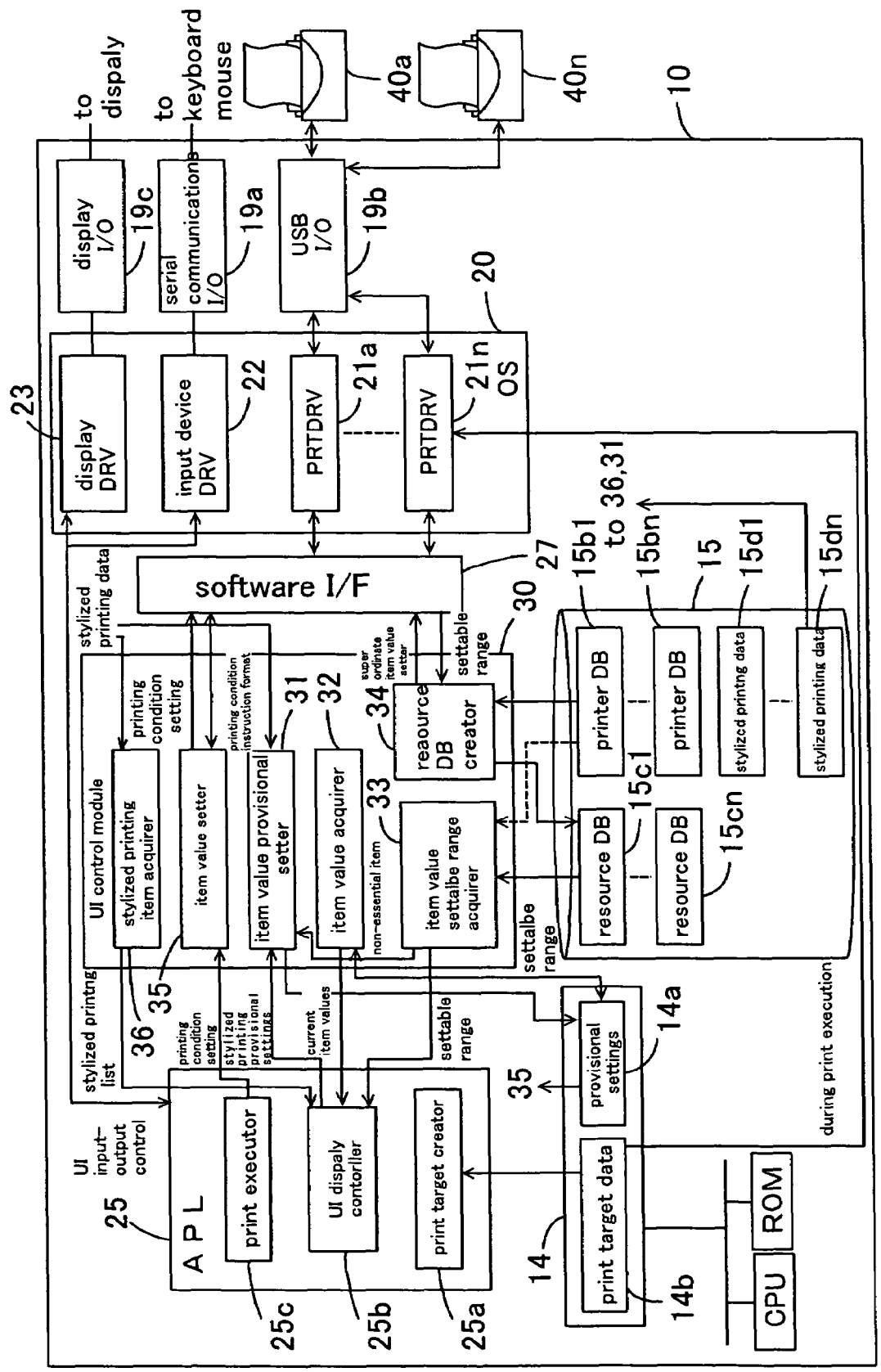
FIG. 1 is a block diagram showing a simplified arrangement of a print control device.

(1) Arrangement of the Invention:
  (1-1) Arrangement of UI Control Module:
(2) Arrangement of Standard Print Data:
(3) Arrangement of Printer DB:
(4) Arrangement of Resource DB:
(5) Print Control Process and UI Display Example:
(6) Other Embodiments
  (1) Arrangement of the Invention:

FIG. 1 is a block diagram showing a simplified arrangement of a computer as a print control device pertaining to the invention. Computer 10 comprises a CPU which serves as the center for operations, ROM and RAM 14 as storage media, and the like; [the computer] is able to execute a predetermined program while utilizing peripherals such as an HDD 15. Operating input devices such as a keyboard and mouse are connected to the computer 10 via a serial communications I/O 19a, and a display for image display is connected via a display I/O 19c. Printers 40 are connected via a USB I/O 19b. In FIG. 1, a multiplicity of printers 40a-40n (Here, "n" appended to a symbol indicates that any plural number may be used.) are shown connected to computer 10.

The printers 40 in this embodiment comprise a mechanism having a detachable ink cartridge for each color, these being filled with inks of several colors. The mechanism can accommodate cartridges of CMYKIcImG (cyan, magenta, yellow, black, light cyan, light magenta, gray) inks. The printers 40 in this embodiment can also use two kinds of K ink as K ink, namely, photo black for use on glossy paper and plain paper, and matte black giving priority to image quality on matte paper.

In a printer 40, either kind of K ink may be used, and instead of G ink, it would be possible to install and use two matte black ink cartridges. G ink is ink consisting of black coloring matter in a solvent, but since the concentration of the coloring matter is lower than that of black ink, by using G ink, it is possible to reproduce tone changes with a high degree of accuracy. Also, in a printer 40, inks may be combined to produce a multitude of colors, and to thereby form an image on a print medium.

Of course, the ink colors useable in printer 40 are only exemplary, it being possible instead to use dark yellow ink, or to use red ink or violet ink, or to use achromatic ink to adjust glossy appearance. Nor is the number of colors limited to seven, nor are the color combinations limited to the combinations mentioned above. Printers 40 in this embodiment are printers of so-called ink jet format, wherein force is exerted on inks contained within an ink head filled with the inks, to eject the inks. At this time, ejecting force may be exerted on the ink by applying voltage to a piezo element, or ejecting force may be exerted on the ink by forming bubbles within the head. The invention is also applicable to various other printers besides the ink jet format, such as laser format.

To describe the computer 10 in a somewhat simplified manner, one having a typical configuration for a personal computer may be used. Of course, the invention is not limited to implementation in a personal computer. Nor is there any need to limit the interface connecting the computer 10 and printer 40 to that described above, it being possible to employ various other connection configurations, such as a parallel interface or SCSI connection, wireless link, or any other connection configuration that may be developed in the future.

Further, while in this embodiment the computer 10 constitutes the print control device, the print control device of the invention could instead be reduced to practice by means of a program execution environment installed in printer 40, with image data targeted for printing being acquired from a digital camera connected directly to printer 40, which carries out the print control process. The UI may be displayed on a small LCD panel on printer 40, or on an LCD panel provided to the digital camera. Of course, in a similar arrangement the print control process could be carried out by the digital camera, the print control process pertaining to the invention could be carried out by distributed processing, or any of various other such arrangements employed. The print control process pertaining to the invention could also be carried out by a so-called multifunctional device that combines in a single unit a scanner for scanning images and a printer for printing images.

In the computer 10 pertaining to this embodiment, the OS 20 incorporates a printer driver (PRTDRV) 21, an input device driver (DRV) 22, and a display driver (DRV) 23. Display DRV 23 is a driver for controlling display of the UI, contents targeted for printing, and the like on the display; input device DRV 22 is a driver for receiving a predetermined input operation by receiving a code signal from the aforementioned keyboard or mouse, input via the serial communications I/O 19*a*.

APL 25 is an application program able to execute color image retouching, document creation, chart creation, or the like; a user, by operating an aforementioned operation input device under execution of APL 25, can print from printer 40 images or text created in APL 25. That is, a print target creator 25*a* of APL 25 writes to RAM 14 print target data 14*b* representing an image, document or the like created under instruction from the user and targeted for printing; and via the display DRV 23 displays on the display an image, document or the like based on print target data 14*b*.

In APL 25, it is possible to execute printing from printer 40 of an image or the like subsequent to image processing in print target creator 25*a*; during printing, a UI enabling printing condition items settings to be made is displayed to the user, and printing is executed according to instruction made from the UI. Further, with this UI it is possible to display a simplified UI that does not require the user to make a large number of print condition settings, but that rather prompts selection of a desired standard from among a multiplicity of standardized print [formats] established in advance and receives an instruction to carry out printing of a plurality of copies of a given target for printing. Thus, APL 25 comprises a UI display controller 25*b* and a print executor 25*c*, with data for displaying a UI for setting printing condition items on UI display controller 25*b* being output to display DRV 23. Settable ranges for printing condition items to be displayed on the UI and data indicating dependency relationships among items are acquired from UI control module 30.

Printing condition items are items of a plurality of conditions required in order to execute printing, and include various printing condition items settable for PRTDRV 21, such as print resolution, ink type (color/monochrome selection or ink set (ink color combination) selection), print medium type and size, layout during printing, borderless printing enabled/disabled, print quality (high quality vs. high speed, etc.), type of color management (auto-correction enabled/disabled, use of colors outside the display gamut enabled/disabled, etc.), bidirectional printing enabled/disabled, image processing by driver enabled/disabled, and the like. In this embodiment, print conditions such as print resolution, ink type and the other items mentioned above are set on an item-by-item basis, so different print conditions can be distinguished as items. Also, the particulars of each print condition setting are specified by a numeric value (setting) corresponding to the particulars thereof, and these numeric values are referred to as item values.

UI display controller 25*b* displays the aforementioned UI on the display, acquires via the aforementioned input device DRV 22 an operation input performed by the user, and ascertains which stylized printing has been specified by the operation input. Here, for each stylized printing template, there are simply determined in advance item values for a plurality of print conditions items necessary for carrying out template printing; once a stylized printing template has been specified, the UI display controller 25*b* acquires the aforementioned predetermined item values, while for other items, it acquires item values that have been set automatically. That is, for items other than those items that have been predetermined by way of a stylized printing template but that are required in order to execute printing, the UI control module 30 determines item values according to an order of precedence and settable ranges described later, and hands these over to UI display controller 25*b*.

In this UI, it is possible to carry out a print execute instruction, and when UI display controller 25*b* detects a print execute instruction on the basis of content of an operation made on the UI, a process carried out by print executor 25*c* commences. The print executor 25*c* is a module that executes printing by setting print conditions for PRTDRV 21 and transferring to PRTDRV 21 print target data targeted for printing. Where multiple copies of a given print target are to be printed, of the multiplicity of printers 40*a*-40*n*, printing is executed by those printers enabling setting of printing condition items required in carrying out stylized printing.

That is, print conditions are set for the PRTDRV that controls the printer(s) executing printing, and print target data targeted for printing is transferred to PRTDRV 21. PRTDRV 21 is a dedicated module provided to each printer 40a-40n; in FIG. 1, PRTDRV 21a-21n for each model are shown installed. PRTDRV 21 further comprises modules, not shown, for performing resolution conversion, color conversion, halftone processing, and other processes; the modules generate print data by carrying out processes depending on item values of printing condition items for print target data targeted for printing. The print data so generated is then output to printer 40 via USB I/O 19b. By means of this operation, printer 40 executes printing on the basis of the print data.

(1-1) Arrangement of UI Control Module:

The aforementioned UI control module 30 administers a process of acquiring settable ranges and dependency relationships for printing condition items needed for UI display and data indicating item values for the printing condition items, and item values in stylized printing [templates]. In this embodiment, the arrangement is such that a stylized printing for readily setting print conditions can be executed by this module. Thus, UI control module 30 comprises an item value provisional setter 31, an item value acquirer 32, an item value settable range acquirer 33, a resource DB creator 34, an item value setter 35, and a stylized printing item acquirer 36.

The UI control module 30 comprises a stylized printing item acquirer 36 so as to be able to display a listing of stylized printing [templates] in UI display controller 25b; stylized printing data 15d is recorded in advance on HDD 15 as data for reference by the stylized printing item acquirer 36. Stylized printing data 15d has recorded therein designations of a multiplicity of stylized printing [templates] and data indicating item values for printing condition items necessary to carry out each stylized printing. Since printer functions and printing condition item settable ranges differ among different printer 40a-40n models, stylized printing data 15d is recorded on a model-by-model basis in HDD 15; FIG. 1 shows stylized printing data 15d1-15dn recorded for use with each individual model. Of course, shared stylized printing data could be specified in advance for all models of printer 40a-40n, with one comprehensive set of stylized printing data 15d recorded on HDD 15 as shared stylized printing data for all models.

The stylized printing item acquirer 36 makes reference to the stylized printing data 15d in order to acquire the designations of the aforementioned multiplicity of stylized printing [templates], and transfers data indicating the designations to the aforementioned UI display controller 25b. In this embodiment, at this time, stylized printing designations for the multiplicity of printers 40a-40n are acquired. Here, printers targeted for acquisition of stylized printing designation could be some or all of the models connected to computer 10. In any case, UI display controller 25b acquires designations for a plurality of stylized printing [templates] by means of the process of stylized printing item acquirer 36, and displays a list of stylized printing designations, while omitting any duplicates. Each stylized printing presented in the list is printable by at least one model of printer.

When a stylized printing instruction is received in the UI control portion 25b, data indicating the specified stylized printing is transferred to the item value provisional setter 31, whereupon the item value provisional setter 31 provisionally sets printing condition item values for carrying out that particular stylized printing. That is, with regard to the transferred stylized printing, for item values described by the aforementioned stylized printing data 15d, these are acquired by making reference to the stylized printing data 15d, and are designated as provisional settings. For item values not described in the stylized printing data 15d, the item value provisional setter 31 provisionally sets these automatically. Item values provisionally set in this way are recorded in RAM 14 as provisional settings 14a. In this embodiment, where printing of multiple copies of a given print target is to be carried out, the aforementioned automatic provisional settings are made on printers 40 wherein item values described in the stylized printing data 15d for the specified stylized printing are settable, with each printer carrying out printing of some copies. The process of displaying a list of stylized printing [templates] and receiving an instruction in the manner described above is equivalent to a process of acquiring and output settable ranges for settable working conditions common to multiplicity of peripherals, and a process of inputting working conditions. Here, since printing conditions are determined by means of a stylized printing instruction, the stylized printing instruction is substantially equivalent to inputting working conditions. The process of printing by a printer wherein set item values are settable is equivalent to a process of identifying a workable peripheral.

When the item value provisional setter 31 performs automatic provision setting for item values not described in stylized printing data 15d, it refers to an order of precedence determined in advance for printing condition items and to the settable range for each item value. In this embodiment, the order of precedence is according to order of size of each item value. That is, settings for items in this embodiment are specified in terms of numerical values, i.e.: 1, 2, . . ." etc., with "1" having the highest precedence and decreasing in precedence with larger values.

Additionally, a settable range is a value settable as an item value in each printing condition item, and the settable range for an item value of another printing condition item can vary with a change in the item value of a specific printing condition item (herein, the former is termed a lower order value and the latter a higher order value). In this embodiment, settable ranges and dependency relationships for items can be acquired by referring to a database created in advance. Thus, at least prior to initiating UI control, printer DB 15b1-15n and resource DB 15c1-15cn are recorded on HDD 15. Here, each printer DB 15b1-15n is a database corresponding to a model of printer 40a-40n, and each resource DB 15c1-15cn is a database corresponding to a model of printer 40a-40n.

In this embodiment, printer DB 15b1-15n are databases describing dependency relationships among printing condition items, and are recorded on HDD 15 at the time that PRTDRV 21 is installed. Resource DB 15c1-15cn have recorded therein superordinate items for each printing condition item, and printing condition item values at each item value of the superordinate items. Accordingly, when the item value of a certain printing condition item changes, it is possible to acquire item values assumable by a printing condition item having this item as a superordinate item, i.e. it is possible to acquire a settable range.

Further, since printing condition dependency relationships and settable ranges differ with different printer models, in this embodiment, printer DB 15b1-15n and resource DB 15c1-15cn are utilized on a printer-by-printer basis, so as to be able to refer to dependency relationship data and settable range data for each model of printer. In this embodiment, since it is also possible that printing condition dependency relationships and settable ranges will differ where PRTDRV 21 version and ink set are different, different resource DB are created for different PRTDRV 21 versions for a given printer, and different resource DB are created for different ink sets, thereby being recorded in advance on HDD 15.

The resource DB creator 34 of UI control module 30 is responsible for creating the resource DB; utilizing the software I/F 27, it refers to the aforementioned printer DB 15b1-15n to create resource DB 15c1-15cn. That is, software I/F 27 has an arrangement that enables exchange of data with PRT-DRV 21 to acquire item values, acquire settable ranges, set item values, and acquire current working environment data; and resource DB creator 34 acquires settable ranges for item values having dependency relationships, while setting items value via software I/F 27.

As described hereinabove, printing conditions exist in dependency relationships, and a settable range for a specific printing condition item can be acquired with the superordinate item value for the specific printing condition item held constant. Accordingly, by repeating a procedure for setting all values assumable by a superordinate item, and acquiring settable-ranges, it is possible to acquire settable ranges and dependency relationships for specific printing condition items. Of course, there is no need for a repeating procedure for printing condition items having no dependency relationship.

In this software I/F 27, while a predetermined processing time is required, it is possible to acquire settable ranges by means of the aforementioned repeating procedure. Thus, data indicating dependency relationship and settable range can be created to serve as resource DB 15c1-15cn. Of course, settable ranges can be created in DB 15c for printing condition items not having the aforementioned dependency relationship as well.

In this embodiment, resource DB are created during initial execution of printing designating printer 40 in computer 10, and once created in this manner are held in HDD 15. Accordingly, in this embodiment, it can be said that both the resource DB and printer DB are created in advance during execution of printing. The contents of each kind of database will be described in detail hereinbelow.

With resource DB having been created in this manner, in order for provisional settings to be made automatically by item value provisional setter 31 for item values not described by the stylized printing data 15d of the stylized printing specified in the above manner, the item value settable range acquirer 33 refers to the resource DB and transfers data indicating settable range of each printing condition item to the item value provisional setter 31. The item value provisional setter 31 then provisionally sets as-needed item values, starting from the highest order item among item values of printing condition items not described in the aforementioned stylized printing data 15d.

Here, when the item value provisional setter 31 determines an item value of a specific printing condition item, it ascertains the provisional setting the for superordinate item thereof, as well as referring to data transferred from the item value settable range acquirer 33 to acquire a settable range for the specific printing condition item, and then selects therefrom the item value having the highest precedence, for use as the provisional setting. When making a setting for the highest level item, since the item is not dependent on any superordinate item, the item value having the highest precedence within the settable range of the item is used as the provisional setting. In this embodiment, when carrying out printing of a plurality of copies of a given target for printing, the item value settable range acquirer 33 makes reference to the resource DB 15c corresponding to the model of printer 40 that will execute printing. The item value provisional setter 31 makes provisional settings of item values on a model-by-model basis for printers 40.

In the above manner, whereas from the users perspective a stylized printing is simply selected on the UI, by means of this the printing conditions necessary for executing stylized printing are provisionally set. Provisional settings 14a are simply provisionally set item values stored in RAM 14; while in actuality settings are not set in PRTDRV 21, the item value setter 35, by means of setting item values via software I/F 27 in accordance with provisional settings 14a, can execute printing at settings per the provisional settings. That is, the item value setter 35 is able to interpret a data format specifying printing conditions to PRTDRV 21 via software I/F 27, as well as setting item values for printing condition items for PRTDRV 21 while conforming to the data format, and thereby causes each printer to execute printing.

Specifically, the item value setter 35 makes reference to provisional settings 14a in RAM 14, and creates data of the aforementioned format such that item values of printing condition items assume the values indicated by provisional settings 14a. When the data is then transferred via software I/F 27, item values of printing condition items are set in PRTDRV 21 in the manner described in the data. In this embodiment, when carrying out printing of a plurality of copies of a given target for printing, data of the aforementioned format is created in settings that have been provisionally set for the PRTDRV 21 corresponding to each printer, and [the data thusly created] is then transferred. In view of the fact that arrangements for specifying printing conditions differs by OS, the arrangement for setting printing conditions with data of predetermined format via software I/F 27 is an arrangement for compensating by carrying out data processing for UI display without any awareness of differences due to the OS, at least in APL 25.

That is, in each type of OS there is typically provided functionality for setting item values for printing condition items for a PRTDRV 21, but the method of setting printing conditions differs by OS. Accordingly, in the present embodiment, there is employed an arrangement whereby UI display is controllable by UI control module 30 by means of a universal method that is not OS-dependent, and during actual execution of printing, printing conditions are set while distinguishing the printing condition setting method in the item value setter 35. As a result, the application creator of APL 25 and the UI provided during printing can specify item values for printing condition items using a common method, and create programs for controlling PRTDRV 21, without any awareness of differences among OS's.

In this embodiment, by means of arrangements such as those described above, printing conditions are settable simply by specifying a stylized printing. In the sense of providing the UI desired by the APL creator, an arrangement that compensates for differences among OS's by means of software I/F 27 in the manner described above is not essential. For example, an arrangement whereby, instead of setting item values of printing condition items via software I/F 27, item values of printing condition items are set directly for each PRTDRV 21 by the UI control module 30 would also be acceptable.

Figure 2:
FIG. 2 is an illustration showing a standard print data description example.

(2) Arrangement of Standard Print Data:

Next, the arrangement of standard print data 15d in this embodiment shall be described in detail. FIG. 2 is an illustration showing a data description example of standard print data 15d. As shown in the drawing, standard print data 15d describes stylized printing designation and data indicating printing condition item values essential for carrying out a stylized printing. In the illustrated example, there are specified a stylized printing designation of "postcard back face (photograph)" and, by way of printing condition item values necessary for printing a photograph on postcard paper, a "1" for ink used and a "2" for print medium size. In the drawing, an ink setting of "1" (non-monochrome) indicates the use of CMYKlclmG inks, and a print medium size setting of "2" indicates that a postcard is used as the print medium.

In this example, when "postcard back face (photograph)" is selected in the UI, for printing condition items other than ink used and print medium size, these are provisionally set to item values included in settable ranges for each model of printer 40, which item values have the highest precedence. That is, since in order to print a photograph on the back of a postcard it is sufficient at a minimum to use color inks and to set a postcard as the print medium, an arrangement whereby mandatory predetermined values are used for these printing condition items, with other items being set according to an order of precedence, is employed.

Of course, various other modes besides this one could be adopted as examples of stylized printing. For example, it would be possible to specify stylized printing of various designations such as "postcard address", "A4 highest quality", "A4 borderless", "A4 plain paper (fast)", "A4 plain paper (high quality)", or the like, and to determine in advance item values for at a minimum those printing condition items necessary for carrying out the stylized printing in question, these being described in stylized printing data 15*d*.

While in the present invention stylized printing designations and mandatory items are intimately related, [the invention] is not necessarily limited to unequivocal determination from designation. For example, stylized printing designations may contain somewhat vague wording, such as "A4 highest quality", in which case printing condition item values for quality cannot be defined unequivocally from the phrase "highest quality." However, where an order of precedence starting from the printing condition item value with the best image quality is created, and "A4" is specified as the print medium size, it will be possible to execute "A4 highest quality" stylized printing.

(3) Arrangement of Printer DB:

Next, the arrangement of the printer DB 15*b* in the embodiment will be described in detail. FIG. 3 is an illustration showing a printer DB 15*b* data description example. As shown in the drawing, printer DB 15*b* describes printer name, driver version, ink set and data indicating dependency relationships. Printer name is data indicating the model name of printer 40 (in this embodiment, "PM-**"); PRTDRV 21 is the driver corresponding to this printer 40. Since printing condition items and dependency relationships are dependent upon model, in this embodiment, which printer DB 15***b* is used for which model of printer is described. This description, in the case that a multiplicity of printers are connected to computer 10 with a multiplicity of PRTDRV being installed for the printers in such a way that any one or combination of these may be used, is used in order to identify for which printer a printer DB has been described.

Driver versions is data identifying the version of PRTDRV 21 (n this embodiment, version 5.3e). A new version of a printer driver may in some instances add new functionality, the aforementioned dependency relationships may change, and error correction and the like may differ among versions, so in this embodiment it is described which driver version a printer DB 15*b* is used for. This description, in the case that the user of computer 10 procures and installs a version upgrade of PRTDRV 21, is used to identify the driver version for which the printer DB should be used. As will be described later, even if resource DB 15*c* has been recorded onto HDD 15, if a resource DB 15*c* for use with the driver version described in printer DB 15*b* has not been recorded on HDD 15, the resource DB 15*c* will be rebuilt, so that even if new functions are added or settable range dependency relationship change with a change in driver version, dependency relationships after the change can be accommodated.

Ink set is data that unequivocally specifies the combination and types of ink cartridges installed on a printer 40 (in this embodiment, a CMYKlclmG ink set composed of pigment based inks). Depending on the combination of ink colors used, color management and image processing enablement/disablement may differ, and the aforementioned dependency relationships may vary, so in this embodiment, a printer DB 15*b* is described in terms of which ink set it is used for. This description, in the event that the user of computer 10 has modified the combination of ink colors installed in a printer 40, is used to identify which printer DB should be used for which ink set.

Dependency relationships are specified by means of cataloging target printing condition items (target items) specifying dependency relationships and superordinate items thereof, while associating them with one another. In this embodiment, dependency relationships are specified by means of describing in order data indicating "target item n, superordinate item number m, superordinate item n1 . . . superordinate item nm." Here, n and m are zero or natural numbers, with m superordinate items being dependent on each n target items, and the superordinate items being cataloged. For target items for which no superordinate item exists, m is 0 and no superordinate item is described. For target items and superordinate items, it is sufficient to be able to identify the target item per se; for example, where the target item is print quality, with the superordinate items numbering one and the superordinate item being print medium type, the description would be "print quality, 1, print medium type.

In this embodiment, the printer DB 15*b* is referred to in order to create the resource DB 15*c*, and thus for this purpose it is acceptable if it describes the aforementioned printer name, driver version, data specifying an ink set, and data specifying dependency relationships; in this embodiment, in order to further enhance convenience, settable ranges may be described. A settable range is shown at bottom in FIG. 3, having a format that describes in order data indicating "target item x, superordinate item number 1, superordinate item x1 and value thereof . . . superordinate item x1 and value thereof, settable range."

That is, whereas the fact of describing dependency relationships for a given target item x by means of describing the number of superordinate items and the superordinate item(s) is an element in common with the dependency relationship format described previously, in the format for settable range, item values of superordinate item(s) are identified, and a target item value when a superordinate item is finally that item value is described. By so doing, it is possible to specify a settable range for a target item when an item value in a superordinate dependency relationship is a specific value. This format is in common with the settable range format described in resource DB 15*c*, described later. Resource DB 15*c* is created by means of dependency relationships described in printer DB 15*b*, but in some instances, an error or the like occurring in PRTDRV 21 during creation thereof may result in an inability to properly acquire a settable range, in which instance an appropriate settable range cannot be described in resource DB 15*c*.

Accordingly, after creation of PRTDRV 21 an appropriate settable range is described in printer DB 15*b*, and during acquisition of a settable range by means of the aforementioned item value settable range acquirer 33, it first makes reference to the printer DB 15b, and when a settable range is described in the printer DB 15b, acquires the contents of the description of the printer DB 15b. By means of this arrangement, even if it should not be possible to properly acquire a settable range due to an error or the like occurring in PRTDRV 21, it will nevertheless be possible to readily transfer an appropriate settable range to the item value settable range acquirer 33.

Figure 4:
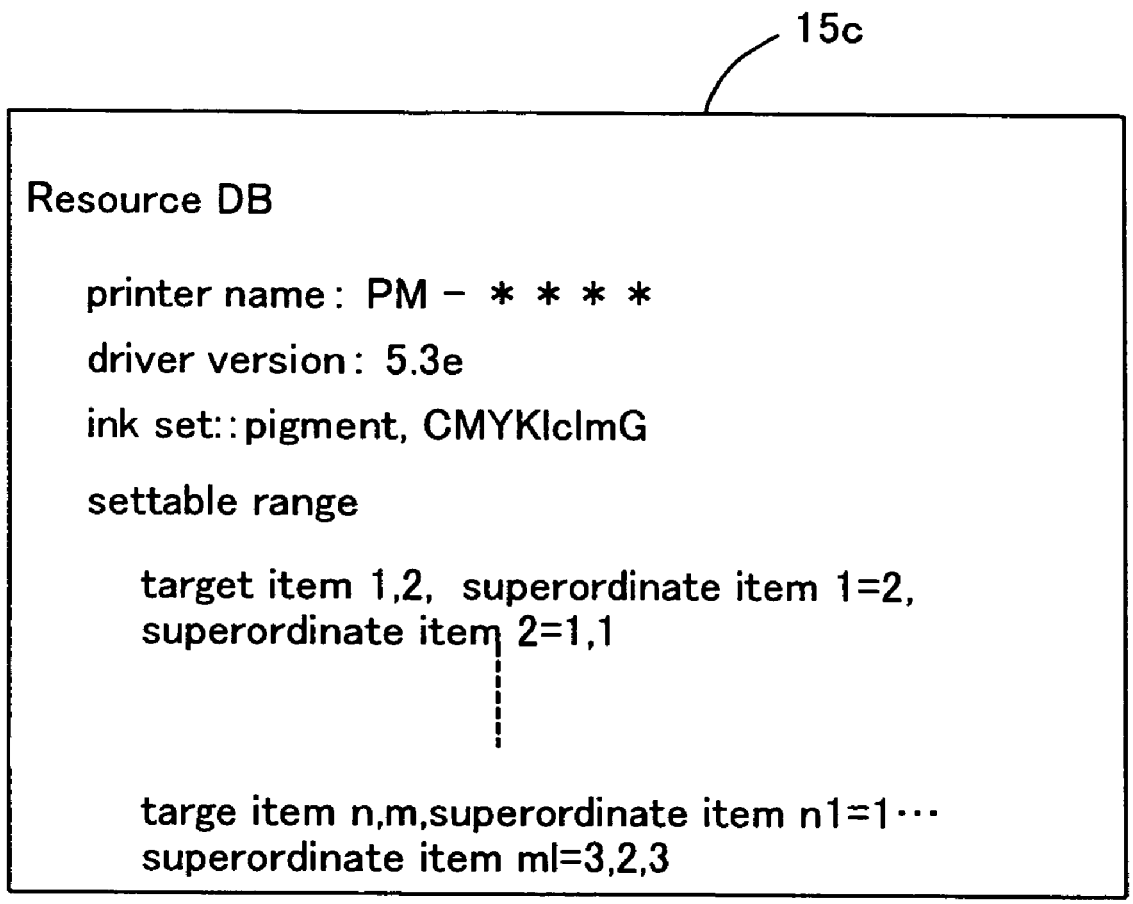
FIG. 4 is an illustration showing a resource DB data description example.

(4) Arrangement of Resource DB:

Next, the arrangement of resource DB 15c in this embodiment shall be described in detail. FIG. 4 is an illustration showing a resource DB 15c data description example. As shown in the drawing, resource DB 15c describes printer name, driver version, ink set and data indicating settable range. Settable range is a format describing in order data indicating "target item n, superordinate item number m, superordinate item n1 and value thereof . . . superordinate item m1 and value thereof, settable range."

By so doing, it is possible to specify a settable range for a target item when an item value in a superordinate dependency relationship is a specific value. For example, in the case that the target item is print quality, the superordinate item is type of print medium, and the number of superordinate items is 1, where the item value for print quality is "2, 3" when the item value for type of print medium is "1", the description will be "print quality, 1, type of print medium=1, 2, 3". Here as well, target items with no dependency relationship are assigned an item number of "0", and the item number of the superordinate item is described directly as the settable range, without describing any superordinate item and value thereof.

Adjustments of various kinds can be carried out on the number of target items described in resource DB 15c. All items present as printing condition items of PRTDRV2 may be described; or in order to avoid it taking an extremely large amount of time in order to create resource DB 15c, only target items having a superordinate item number that does not exceed a predetermined number (e.g. 4 or fewer) could be described. Alternatively, an arrangement whereby printing condition items that have low frequency of utilization on the UI are identified in advance, and these low use frequency items and printing condition items that do not appear on the UI (printing conditions that are required to be set in order execute printing but that cannot be set by the user, being determined instead by the APL or the like) are not described in resource DB 15c could be used.

In the manner described hereinabove, in the printer DB 15b, resource DB 15c, and stylized printing data 15d, item values for printing condition items are specified in terms of numeric values, with the meanings of numeric values being determined in advance. For example, type of print medium=1 is determined in advance as meaning "plain paper." Accordingly, while specification of printing conditions for printing condition items is herein referred to as determining item values, it is of course sufficient in the present invention that it be possible to specify printing conditions, so it is not mandatory to identify printing conditions by means of numeric values, it being possible to employ various other arrangements such as specification with text strings.

Further, data indicating printer name, target item, stylized printing designation, and other kinds of information mentioned hereinabove can be described in either the printer DB 15b, resource DB 15c, or stylized printing data 15d, with the form of data description not being limited to the format described above. Of course, in the sense of describing data, it is sufficient to indicate information of various kinds, it being possible in computer 10 to employ a text format, to employ a binary format, or to employ any of various other arrangements.

Figure 5:
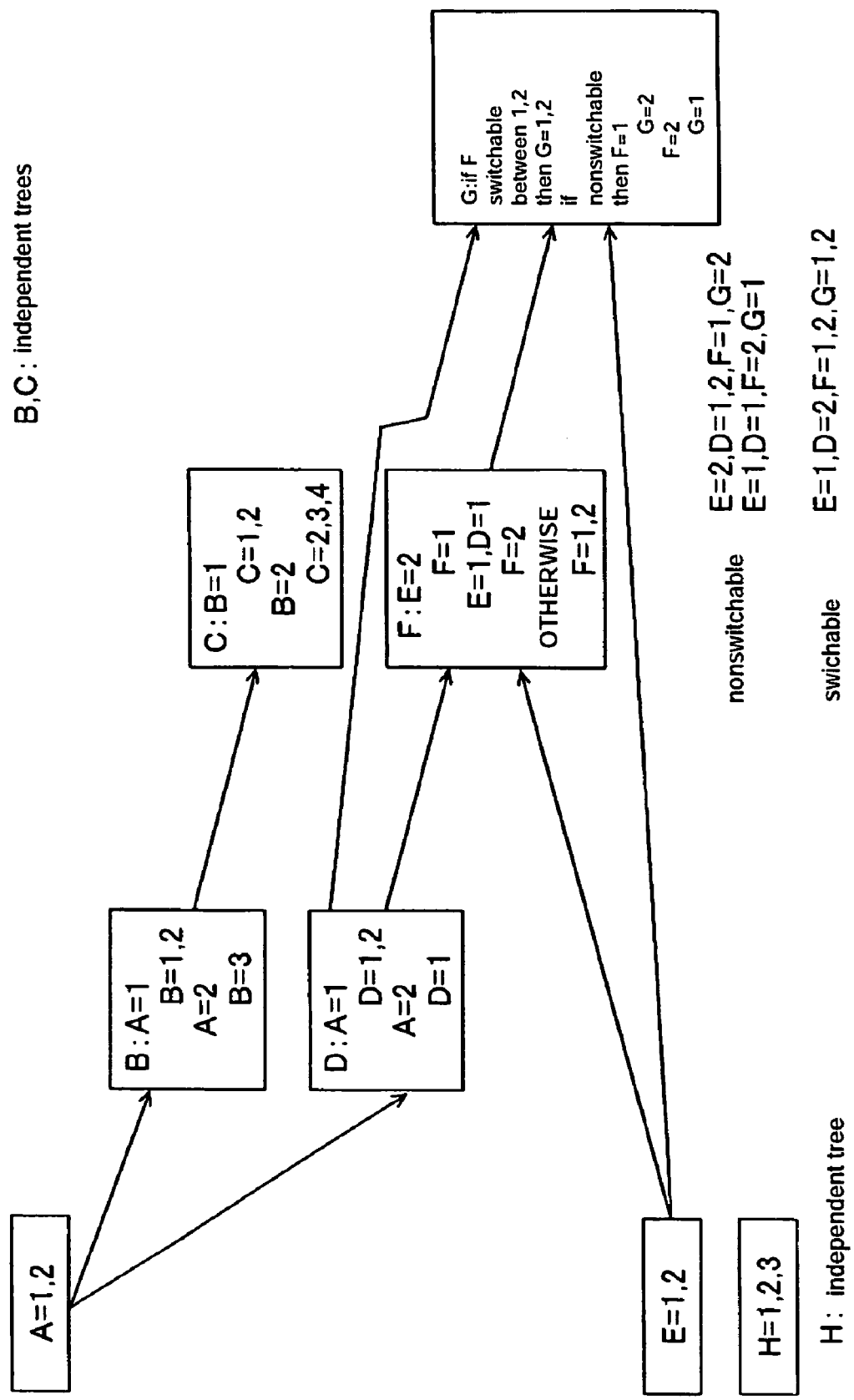
FIG. 5 is an illustration showing dependency relationships together with settable ranges.

FIG. 5 is an illustration showing dependency relationships together with settable ranges determined in the manner described above. In the drawing, A-H indicate printing condition items, with dependency relationships shown by arrows. A printing condition item situated at the tip of an arrow is a subordinate item, and a printing condition item at the opposite end is a superordinate item. For example, printing condition item A represents a superordinate item for printing condition items B and D. Where items in a dependency relationship have a one-to-one relationship of a superordinate item with a subordinate item, that is a dependency relationship like that of B, C shown in FIG. 5, this is termed an independent tree; and where for a given items there are several subordinate items or superordinate items, i.e. an item like printing condition item F (having D and E as superordinate items) shown in FIG. 5 is termed a non-independent tree.

In the aforementioned printer DB 15c which indicates dependency relationships for printing condition items, independent trees and non-independent trees can be described, so that complicated dependency relationships can be described by an extremely simple format. That is, in the case of an independent tree, it would be acceptable for example to show printing condition item B as a superordinate item of printing condition item C; and in the case of a non-independent tree, it would be acceptable for example to show printing condition items D, E as two superordinate items of printing condition item F.

Additionally, in the aforementioned resource DB 15c which indicates settable ranges, since the settable range of a target item is indicated while indicating a superordinate item and a specific item value of the superordinate item, complex dependency relationships and settable ranges like those shown in FIG. 5 can be described easily. In the drawing, for each printing condition item, item values of the superordinate item and item values of the target item in the item value are shown. For example, in printing condition item B, it is indicated that when the item value of superordinate item A is "1" the settable range for item B is "1, 2", and when the item value of superordinate item A is "2" the settable range for item B is "3."

In printing condition item F shown in FIG. 5, as shown in the drawing when superordinate item E is "2" item F is "1", and when superordinate item E is "1" and superordinate item D is "1" item F is "2", in other cases item F being "1, 2." In this way, there is a complex dependency relationship whereby when a superordinate item is a specific item value the item value of item F is dependent on the superordinate item. However, even such a dependency relationship can be described in simple format in resource DB 15c. That is, values for superordinate items and values for F for all cases, including the case where the aforementioned E=2 and the case where E=1 and D=1, are described in resource DB 15c.

The case is similar for even more complex dependency relationships, such as printing condition item G. With printing condition item G, the conditions are that if superordinate value F is switchable between "1, 2" G is "1, 2", and if nonswitchable when item F is "1" item G is "2", and when item F is "2" item G is "1". That is, item G is dependent on the condition of whether item F is switchable, and on the item value of F. Regarding the condition of whether item F is switchable, while this cannot be specified solely by the dependency relationship between item F and item G, if items D, E—which represent superordinate items for item F—are used as well, it becomes possible to specify a settable range for item G.

Accordingly, in this case items D, E, F represent superordinate items for item G, and having specified item values for items D, E, F, by then describing a settable range for item G, it is possible to specify complex conditions including whether item F is switchable as described above. Specifically, as shown at lower right if FIG. 5, nonswitchable refers to a case in which there is no discretion as to the settable range for item F, the item value being "1" only or "2" only, with item F being "1" only in E=2 as mentioned previously. Accordingly, in this case, the description in resource DB 15*c* will have items E, D, F as superordinate items for item G, a item value of "2" for item E, item values of "1, 2" for item D, a item value of "1" for item F, and a settable range of "2" for item G.

As regards the case where item F is "2" only, the description in resource DB 15*c* will have items E, D, F as superordinate items for item G, item values of "1", "1", "2" respectively, and a settable range of "1" for item G. Where switchable, it is acceptable to cite data wherein item values of the aforementioned superordinate items D, E, F are different from the values in the above example, and the settable range for item G is "1, 2." In the above manner, in this embodiment by employing in the resource DB 15*c* a format that describes superordinate items and values thereof, it is possible to create a resource DB 15*c* in which even complex dependency relationships may be described simply.

Figure 6:
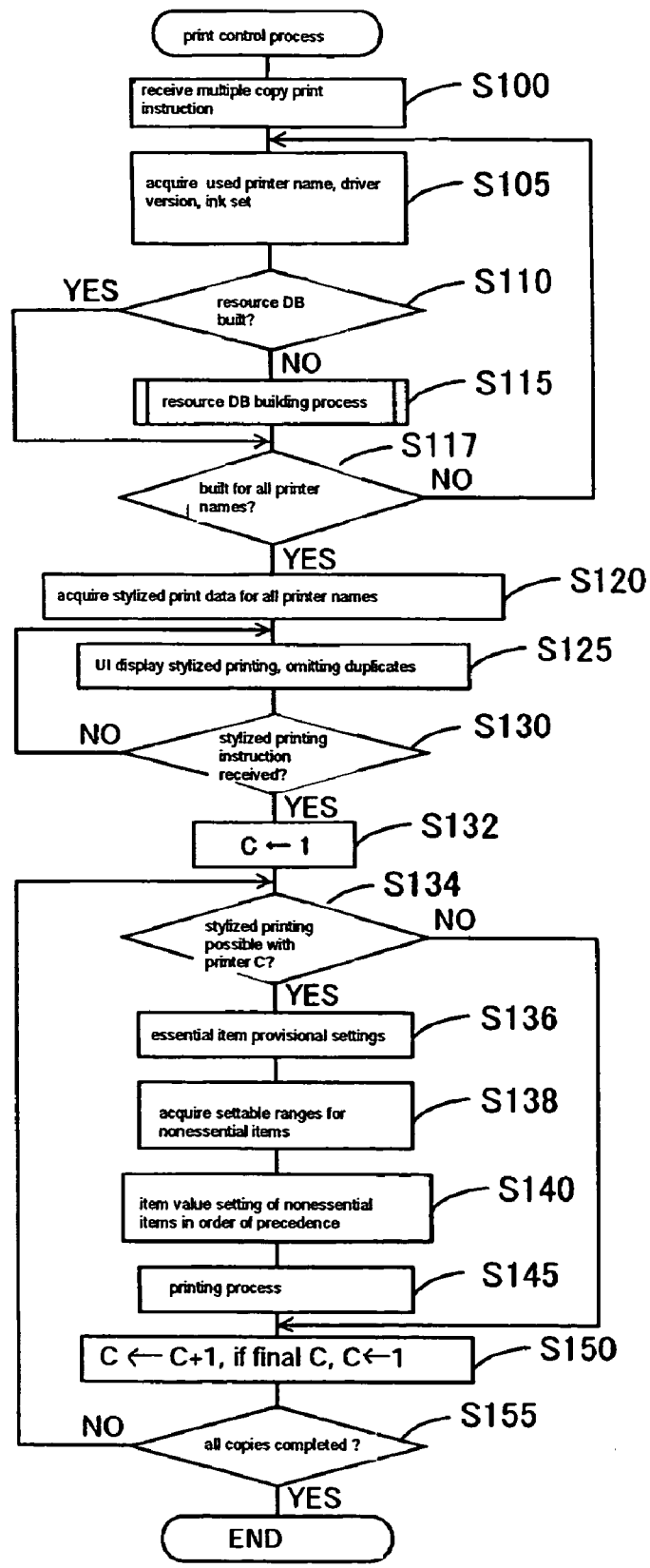
FIG. 6 is a flowchart of a print control process.
Figure 7:
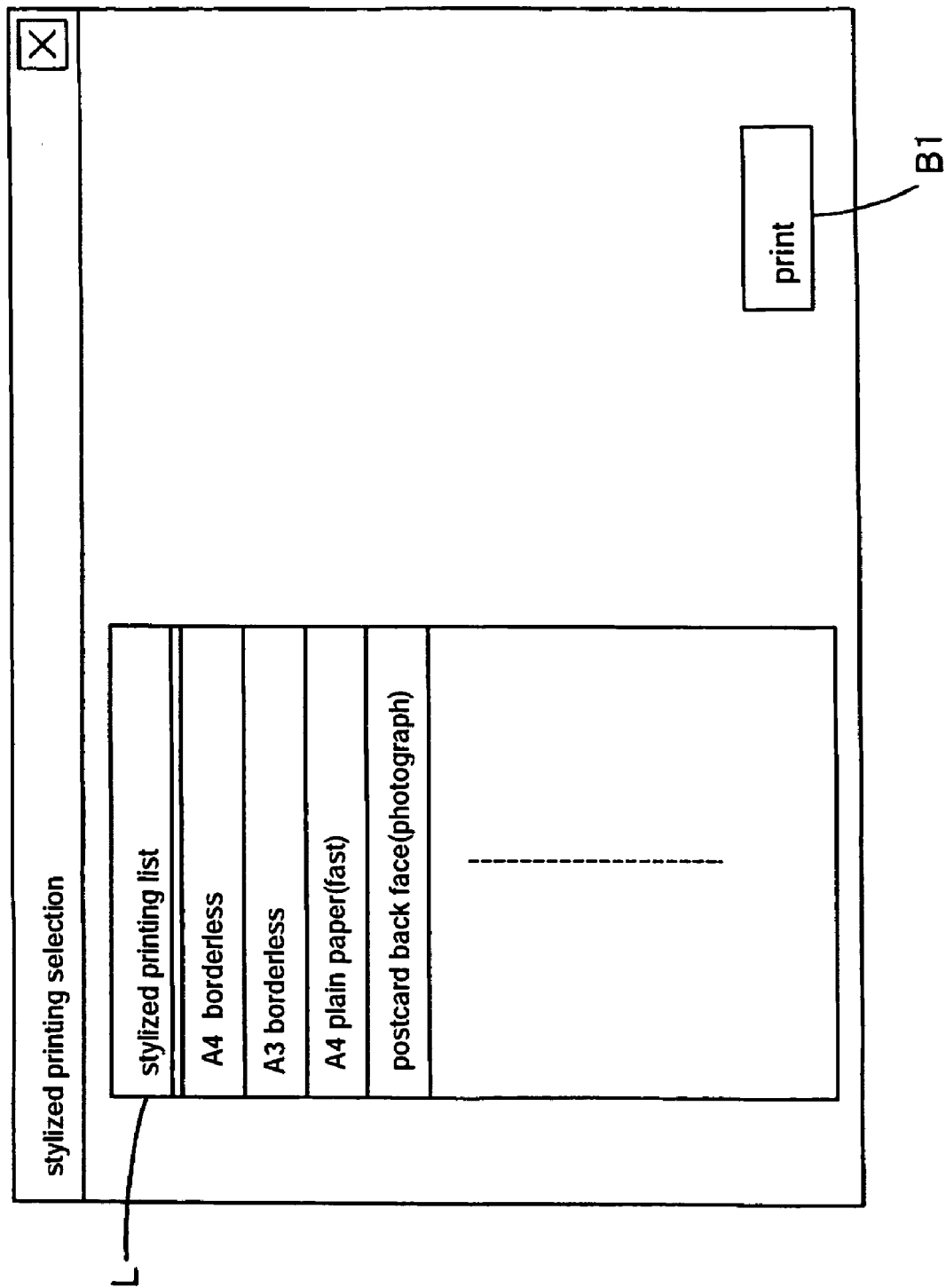
FIG. 7 is an illustration showing a UI display example.

(5) Print Control Process and UI Display Example:

Next, a multiple-copy print control process and UI display example will be described. The multiple-copy print control process is carried out in accordance with the flow depicted in FIG. 6; FIG. 7 is an example of the UI displayed at this time. The user can issue a print instruction to print multiple copies of an image or the like targeted for retouching during execution of APL 25, and when print target creator 25*a* received a multiple copy print instruction (Step S 100), the UI display controller 25*b* controls UI display in collaboration with the UI control module 30. At this time, the resource DB creator 34 acquires the printer names of the printers connected to computer 10 (Step S105). Also acquired are the version of the PRTDRV 21 that controls the printer, and the ink set.

As the PRTDRV 21 version and ink set, there may be employed an arrangement whereby the PRTDRV 21 is queried, the PRTDRV 21 then responding with its own version and the ink set installed on the printer targeted for control; there may be employed an arrangement whereby information indicating the ink set is acquired through communication with the printer 40; there may be employed an arrangement whereby information indicating version is recorded in advance in a predetermined storage medium during installation or version upgrade of the PRTDRV 21, and reference made to this information; or there may be employed various other arrangements.

In any event, once information indicating name of printer used, driver version, and ink set is acquired, the resource DB creator 34 in Step S 110 refers to the HDD 15 to determine whether a resource DB 15*c* for the particular printer name, driver version, and ink set has been established previously and recorded on HDD 15. In this same Step S 110, if it is not decided that a resource DB 15*c* has been established previously, the resource DB creator 34 then proceeds to Step S115 and executes a process to establish a resource DB 15*c,* making reference to the printer DB 15*b* that corresponds to the printer name, driver version, and ink set.

When in Step S110 it is decided that a resource DB 15*c* has been established previously, Step S115 is skipped. Then, in Step S117 it is ascertained whether resource DB 15*c* have been established for all printers connected to computer 10, with Step S105 and subsequent steps being repeated until it is determined that [resource DB] have been established for all printers.

That is, when executing printing for the first time after having connected a printer 40 to computer 10 and installed the PRTDRV 21, when executing printing for the first time after changing the PRTDRV 21 version by means of a version upgrade of PRTDRV 21 or the like, or when executing printing for the first time after having changed the combination of ink colors installed on printer 40, it is decided that a resource DB 15*c* has not yet been established, and a resource DB 15*c* is then established. By carrying out this process for all printers, the required resource DB 15*c* can be created in advance. When establishing a resource DB 15*c,* since a certain amount of time is required, it is preferable to employ an arrangement whereby the user is notified that the system is in-process, by means of displaying a progress bar or the like on the display.

During second and subsequent print operations taking place after PRTDRV 21 has been installed or upgraded, or after the ink set has been changed, the process proceeds without establishing a resource DB 15*c*. In Step S115, it is sufficient to be able to establishing a resource DB 15*c* by referring to printer DB 15*b;* for example, this could be realized by a process wherein having determined a item value for a superordinate item for a given item, operations to acquire settable ranges for subordinate items thereof are carried successively going from superordinate to subordinate, for example.

Since the printer DB 15*b* is recorded on HDD 15 at the time that the PRTDRV 21 is installed, Step S120 and subsequent processes are executed with printer DB 15*b* and resource DB 15*c* recorded on HDD 15. In Step S120 and subsequent processes, the UI display controller 25*b* displays a UI for selecting stylized printing. To accomplish this, first, in Step S120 the stylized printing item acquirer 36 refers to stylized printing data 15*d* for all printers, and for the purpose of displaying stylized printing in list form, transfers to the UI display controller 25*b* data indicating several types of stylized printing, described by the stylized printing data 15*d.*

By means of this the UI display controller 25*b,* in Step S125, displays a list of all acquired stylized printing designations (while omitting those that would be displayed in duplicate), as well as displaying on the display a UI enabling alternative selection from among these. FIG. 7 is an illustration showing a UI display example in this embodiment. With the UI pertaining to this embodiment, in the example shown in the drawing, a stylized printing list L is displayed at left on the screen, and a print instruction button B1 is displayed at lower right in the drawing. In this example, stylized printing types determined in advance for all printer are presented as a list, without any duplication; any of these stylized printing types can be executed by at least one printer among the printers connected to computer 10. In Step S130 the UI display controller 25*b* decides whether the user has operated the aforementioned input device to specify a stylized printing, and whether selection of the aforementioned print instruction button B1 has been received, repeating the process of Step S125 and subsequent steps until it is determined that specification of a stylized printing has been received.

In Step S130, when it is determined that specification of a stylized printing has been received, in the process of Step S132 and subsequent, printing conditions are set for each model of printer that is able to perform the selected stylized printing, and successive printing is carried out. To accomplish this, first, in Step S132 a counter c used in a loop process is initialized (a "1" is put into c). In Step S134 and subsequent, numbers are assigned in order to printers connected to computer 10, with each printer being identified by means of a value of counter c.

That is, in Step S134 the item value settable range acquirer 33 refers to the printer DB 15b and resource DB 15c of the printer, and determines whether printing conditions are settable in the manner indicated by the item values for necessary items described in the stylized printing data 15d of the selected stylized printing. That is, it is determined whether the selected stylized printing can be carried out by printer c. Here, it is sufficient to be able to determine whether the selected stylized printing can be carried out by printer c, and it is possible to employ various arrangements for doing so, such as referring to the stylized printing data 15d1-15dn for each model to determine whether the stylized printing in question can be carried out by printer c.

In Step S134, when it is determined that the selected stylized printing can be carried out by printer c, in Step S136 the aforementioned item value provisional setter 31 refers to the stylized printing data 15d of the selected stylized printing, and acquires the printing condition item value essential for performing the selected stylized printing. This item value is recorded as a provisional setting 14a in RAM 14.

Further, in Step S138 the item value provisional setter 31 refers to the resource DB 15c of printer c, and acquires from the aforementioned item value settable range acquirer 33 settable range data for items other than the aforementioned essential printing condition item (non-essential items). Next, in Step S140, while making reference to this settable range data, printing condition item values are set from higher order items so as to give the item value of highest precedence within the settable range. The item values set here are recorded as provisional settings 14a in RAM 14.

Once the process of provisionally setting printing conditions for stylized printing by printer c means of the above process has been completed, in Step S145, the print executor 25c outputs print target data targeted for printing to PRTDRV 21, as well as issuing an instruction to set printing conditions to the item value provisional setter 31. Also, the item value provisional setter 31 accesses the software I/F 27 and set printing condition item values recorded in the provisional settings 14a for the PRTDRV 21. As a result, the PRTDRV 21 performs image processing of print target data in accordance with the printing conditions as well as creating print data for executing printing according to the print conditions, and outputs this to the printer 40 for printing.

In Step S134, when it is not determined that the selected stylized printing can be carried out by printer c, Steps S136-S145 are skipped, and printing is not executed by the printer (s) in question. In Step S150, the counter c is incremented or initialized. That is, while normally counter c is incremented, in the event that the counter c contains the same number as the number of printers connected to computer 10, counter c is initialized instead. Then, in Step S155, a determination is made as to whether printing of all copies for which print instructions were issued has been completed, repeating the process of Step S134 and subsequent until it is determined that printing of all copies has been completed.

By means of the above process, it is possible to complete all necessary printing condition settings simply by specifying a stylized printing by means of the UI, as well as to carry out multiple copy stylized printing with a multiplicity of printers. When carrying out printing of multiple copies with a single printer, it is necessary to wait for one image or document to finish printing before again printing the same image or document. However, in an arrangement such as that in the present embodiment, wherein a printing process is executed while performing settings for a given printer, and additionally a printing process is executed while performing settings for another printer, it becomes possible to complete settings and commence printing with the other prior, prior to printing being completed by the first printer, so that printing of multiple copies can be completed very quickly.

Further, since settings are made for a printer settable to the printing conditions essential for each type of stylized printing, when executing printing by a multiplicity of printers, printers capable of carrying out the particular stylized printing can be precisely extracted, and made to carry out printing. Additionally, since items other than printing condition items essential for carrying out stylized printing have item values set within settable ranges and according to precedence, printing settings that cannot be carried out by the printer 40 can be avoided even if only stylized printing is specified, so that printing can be executed properly.

Further, where precedence is determined according to predetermined criteria, it becomes possible to maximize the capabilities of each printer 40. For example, by assigning higher precedence to item values which, when item values of printing condition items are compared with one another, are seen to afford relatively high picture quality, it becomes possible to set items other than printing condition items that are essential for performing stylized printing in such a way that printing at the highest possible picture quality is carried out, and as a result to obtain a printout of the highest picture quality for executing stylized printing. Additionally, by assigning higher precedence to item values which, when item values of printing condition items are compared with one another, are seen to afford relatively fast processing, it becomes possible to set printing condition items in such a way that printing is carried out as quickly as possible, and as a result to complete at maximum speed the processing for executing stylized printing.

Of course, rather than having a uniform precedence as in the present embodiment, it would be possible instead to enable user selection of precedence, or to vary precedence depending on the type of stylized printing for example, whether stylized printing gives precedence to speed, or whether stylized printing gives precedence to quality). In such cases, data to indicate precedence to the user could be created during selection, or data indicating precedence for each type of stylized printing could be created in advance, with the item value provisional setter 32 making reference to this data when making settings.

(6) Other Embodiments

In the present invention, when printing several documents or the like in a multiplicity of printers, it is sufficient to be able to rapidly switch the display on the UI, while precisely setting printing conditions for the multiplicity of printers; printing conditions are not limited to stylized printing only. For example, in the event of setting from the UI desired item values for printing condition items desired by the user, it is possible to employ an arrangement whereby those settings are made for a multiplicity of printers, and a multiplicity of documents or the like printed out.

Figure 8:
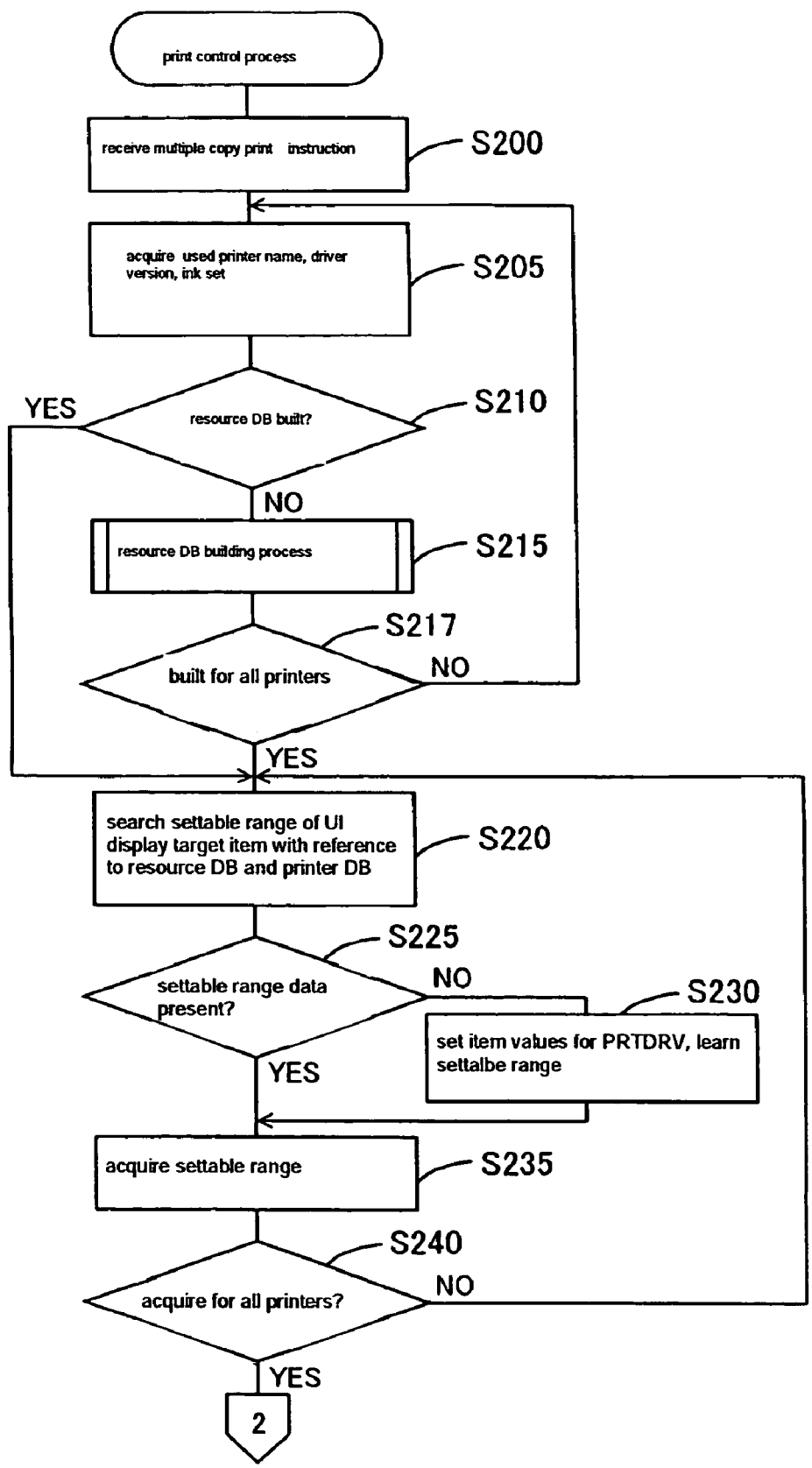
FIG. 8 is a flowchart of a print control process.
Figure 9:
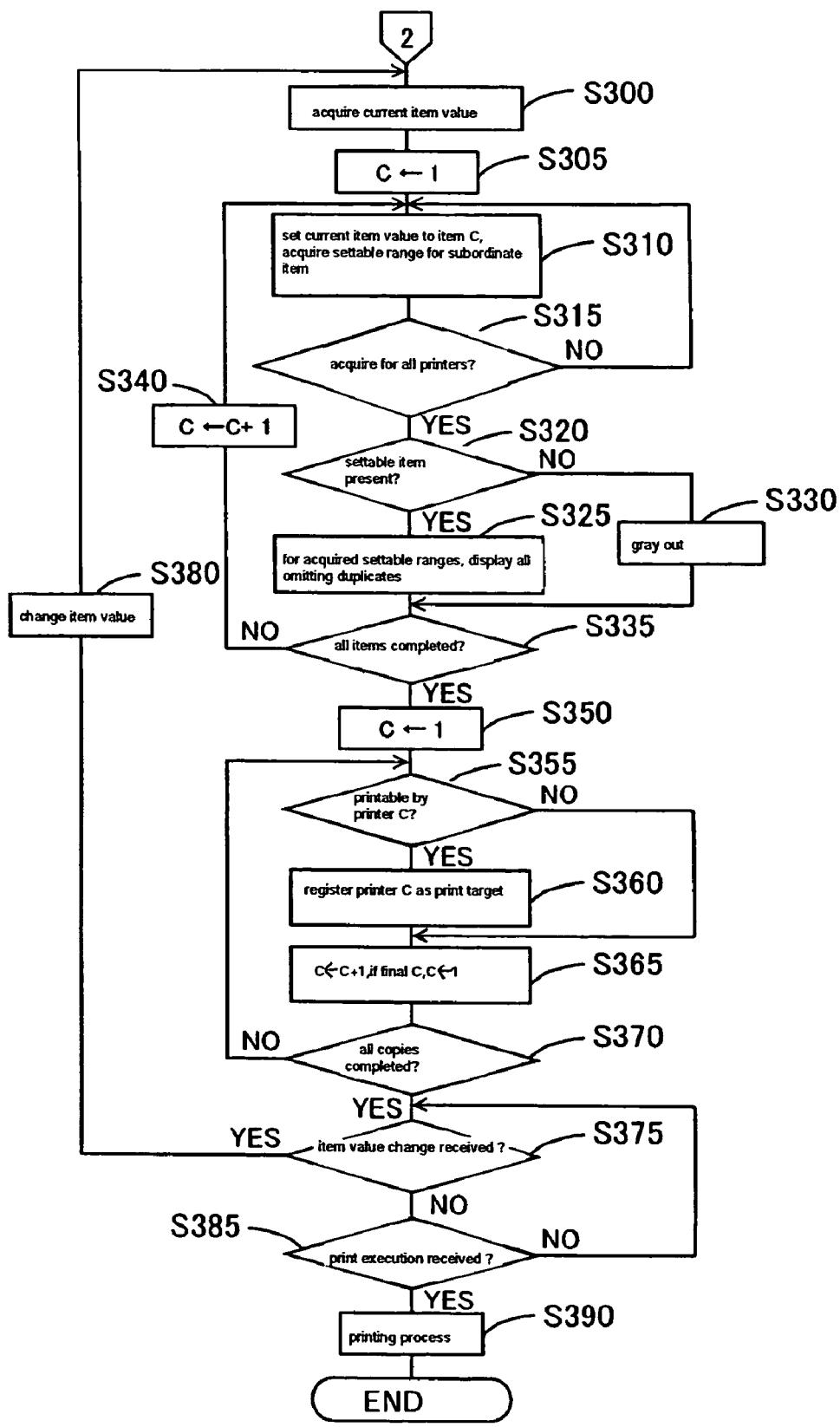
FIG. 9 is a flowchart of a print control process.

While such an arrangement may be realized by means of an arrangement substantially similar to the arrangement shown in FIG. 1, since settings relating to stylized printing are unnecessary, there is no need to record stylized printing data 15d on HDD 15, nor is there any need to provide the UI control module 30 with a stylized printing item acquirer 36. Setting of printing condition items may be realized by means of a process according to the flow chart in FIG. 8 or FIG. 9. In this process, Steps S200-S217 are analogous to the process shown in FIG. 6. That is, resource DB 15c1-15cn and printer DB 15b1-15bn for all printers are recorded on HDD 15.

In the process of Step S220 and subsequent, the UI display controller 25b, in order to display a predetermined UI, acquires settable ranges for printing condition items targeted for UI display. Here, the UI can be any interface by which it is possible to set item values of printing condition items which the user desires to set, and any of various arrangements could be employed. In this embodiment, the UI is assumed to be a UI that allows printing condition items which the user desires to set to be set from a single screen, but of course some other mode such as one wherein a small number (1 to 3, for example) of printing condition items are displayed on a single screen, with numerous printing condition items being set by switching among successive screens.

In Step S220, a search is carried out targeting resource DB 15c and printer DB 15b corresponding to printer name, driver version and ink set specified by the item value settable range acquirer 33, and in Step S225 a determination is made as to whether printing condition items targeted for UI display in this search are described as the aforementioned target items. In this same Step S225, when it is not determined that printing condition items targeted for UI display in this search are described as the aforementioned target items, in Step S230 resource DB creator 34 actually sets item values for PRTDRV 21 and acquires settable ranges. That is, making reference to printer DB 15b, it is determined, for each printing condition item targeted for UI display, whether there is a superordinate item, and in the event that a superordinate item exists, a item value for this superordinate item is set in the PRTDRV 21 via software I/F 27, and the settable range assumable by the printing condition item targeted for UI display with the item value for the superordinate value set in this way is acquired.

At this time, for item values of a superordinate item, successive settings are made for all item values that the superordinate item can assume, while acquiring the settable range assumable by the printing condition item targeted for UI display at each item value setting of the superordinate item. In the event that no superordinate item exists for a printing condition item targeted for UI display, a settable range for the printing condition item is acquired via software I/F 27, without setting a item value other than the printing condition item targeted for UI display. The settable range so acquired is described in resource DB 15c. Accordingly, even if a printing condition item targeted for UI display is not described in the resource DB 15c and printer DB 15b, it will not be determined to not be described at the time of the next printing.

In this Step S230, the process for acquiring settable range is carried out after having actually set item values for the PRTDRV 21, and thus the process takes a certain amount of time. However, the fact that a condition in which a printing condition item targeted for UI display is not described can occur is limited to specific cases, such as to avoid it taking an extremely large amount of time in order to create resource DB 15c, with virtually all items required for carrying out UI display being described in advance in resource DB 15c. Accordingly, in actual practice it is rare for Step S230 to be carried out.

In Step S235, the item value settable range acquirer 33 acquires settable ranges for printing condition items found to be described in printer DB 15b and resource DB 15c in the aforementioned Step S220, or for printing condition items described in resource DB 15c in Step S230. In Step S240, a determination is made as to whether the process to acquire this settable range has been carried out for all printer names acquired in Step S205, and in this same Step S240, Step S220 and subsequent are repeated until it is determined that the settable range acquisition process has been carried out for all printers.

In this embodiment as well, item values of printing condition items are recorded as provisional settings 14a in RAM 14 until a print instruction is issued; in Step S300, the item value acquirer 32 refers to provisional settings 14a in RAM 14, or acquires current item values via the software I/F 27. That is, in the loop process of Steps S300-S380, since during the initial process there will be no existing information recorded by way of provisional settings 14a, item values for printing condition items in the printer used at the time of executing the previous printing operation are acquired via the software I/F 27, and transferred to the UI display controller 25b as current item values. At this time, these current values are recorded as provisional settings 14a in RAM 14.

Further, since here item values for printing condition items in the printer used at the time of executing the previous printing operation, the combination of acquired item values will be a combination of item values settable for at-least one of the printers. Also, in the loop process of Step S220 and subsequent, in the second and subsequent processes, reference is made to the provisional settings 14a, and transferred as current item values to the UI display controller 25b.

In Steps S305-S340, a process for UI display is carried out. First, in Step S305, a counter c used in a loop process is initialized (a "1" is put into c). This counter is used to identify one at time items targeted for UI display, the process proceeding in such a way that smaller counter values indicates a superordinate items. In Step S310, the item value settable range acquirer 33 acquires the settable range for a subordinate item of item c. Specifically, referring to printer DB 15b and resource DB 15c, in the event that a current item value acquired in Step S300 was set for the aforementioned item c, it acquires the settable settable range as the subordinate item thereof Also, where a number of subordinate items exist, settable ranges are acquired for all of these. The settable range so acquired is then transferred to the UI display controller 25b.

In Step S315, a determination is made as to whether the process of acquiring settable ranges for subordinate items has been carried out for all printers 40a-40n, and Steps S310, S315 are repeated until it is determined that settable ranges for subordinate items have been acquired for all printers. When in Step S315 it is determined that settable ranges for subordinate items have been acquired for all printers, a determination is made as to whether there exist item values settable within the settable ranges acquired by the UI display controller 25b in the process described above (Step S320). That is, a determination is made as to whether there is a condition of an inability to set any item value in all printers.

Further, since item values acquired in Step S300 are item values of printing condition items in the printer used at the time of executing the previous printing operation, a condition in which no item value can be set in the initial loop process of Steps S300-S380 will not arise. However, in the second and subsequent loop processes, since the user modifies item values of printing condition items arbitrarily in the manner described hereinbelow, it is possible that a condition will arise wherein there is no settable range for any printing condition item.

Accordingly, when in Step S320 it is not determined that a settable item value exists, the UI display controller 25b produces a grayed-out display of the subordinate item (subordinate item of item c) on the UI (Step S330), thereby clearly indicating on the UIU that there is no settable range. When in Step S320 it is determined that a settable item value exists, the UI display controller 25b displays on the UI all settable ranges (excluding duplicates) for the settable ranges acquired in the loop of the aforementioned Steps S310, S315 (Step S325).

That is, all item values extracted at least once as settable ranges in Steps S310, S315 are displayed as decision branches, with item values that can be set in at least one printer being displayed on the UI. For example, in the event that two or more printer models whose settable range for print medium includes A3 paper are connected, a decision branch having "A3" as the settable range would be displayed at one location on the UI, rather than being displayed at two locations.

In Step S335, a determination is made as to whether the process of Steps S310-S325 has been completed for all items targeted for UI display, and if it is not determined that [the process] has been completed for all items, in Step S340 the counter is incremented, i.e. the printing condition item is changed to a subordinate item, and the process of Steps S310-S325 is repeated. Next, in Steps S350-S370, a printer targeted for printing is designated. That is, in Step S350, the counter used in the loop process is initialized (a "1" is placed in c).

In Steps S350-S370, numbers are assigned in order to printers connected to computer 10, each printer identified by a value of counter c, and the item value settable range acquirer 33 makes reference to the printer DB 15b and resource DB 15c of printer c to determine whether printing conditions are settable in the manner of the item values described in the aforementioned provisional settings 14a.

Specifically, in Step S355, for the printer identified by counter c, a determination is made as to whether printing can be carried out in the manner of the item values described in the aforementioned provisional settings 14a. At this time, the UI display controller 25b refers to the settable ranges for the printer c via the aforementioned item value settable range acquirer 33, and in the event that item values of the aforementioned provisional settings 14a were set from superordinate items, decides that printing can be carried out if item values are within the settable ranges of printer c.

In Step S355, when it is determined that printing conditions are settable in the manner of the item values described in the provisional settings 14a, the printer identified by counter c is recorded as a print target printer for printing some number of copies among the copies specified in the aforementioned Step S200 (Step S360). In Step S355, when it is not determined that printing conditions are settable in the manner of the item values described in the provisional settings 14a, Step S360 is skipped. Printer registration can employ an arrangement such as storing data indicating printers in RAM 14.

In Step S365, counter c is incremented or initialized. That is, while normally counter c is incremented, in the event that the counter c contains the same number as the number of printers connected to computer 10, counter c is initialized instead. Then, in Step S370, a determination is made as to whether print target printers have been registered for all copies specified in the aforementioned Step S200, and the process of Steps S355-S370 is repeated until it is determined that print target printers have been registered for all specified copies. If the number of printers able to carry out printing under printing conditions as described in the aforementioned provisional settings 14a is smaller than the number of copies specified, printing of [at least some of] the multiple copies will be executed by a same given printer.

By means of the above process, print target printers for printing the specified copies are identified. In Step S370, when it is determined that print target printers have been registered for all of the specified number of copies, in Step S375 the UI display controller determines whether a change in item value has been received. If it is determined in Step S375 that a change in item value has been received, in Step S380 the item value provisional setter acquires the changed item value as the provisional value, updates the provisional value 14a in RAM 14, and repeats the process of Step S300 and subsequent.

In this repeating process, even if dependency relationships among printing condition items targeted for UI display should vary due to a change in a item value of Step S355, since an item value in which the variation is reflected serves as the current item value, in the process of Step S325, an appropriate settable range that reflects this variation is acquired. Thus, the UI display can be updated without selectably displaying printing condition items that are nonselectable in the UI display of Steps S325, S330.

By means of the above process, even if a multiplicity of printers are connected, a settable range settable for at least any one model of these printers can continue to be displayed as a decision branch, and after setting of item values from the UI has been completed, settings by which printing is executable by at least one model of printer may be made. In the repeating process, when acquiring current item values in Step S300, there is no setting of item values for PRTDRV 21 via software I/F 27. Accordingly, in the event that item values are modified even once from the UI from the time that the UI is initially displayed until printing is executed, the UI display can be switched rapidly. The aforementioned Step S300-Step S335 are equivalent to a process of acquiring and outputting settable ranges of working conditions settable in common for a multiplicity of peripherals, and a process of inputting working conditions. Steps S350-S375 are equivalent to a process of identifying workable peripherals.

As a specific UI, it is possible to employ an example such that printing condition items are selectably presented on a single screen as described above. That is, they are presented such that user-selectable printing condition items and decision branches for these can be selected on a single screen. As the decision branch selection mode, there could be employed any of various modes such as radio buttons, check boxes, or scroll bars.

In this embodiment, there is additionally provided a button for issuing a print instruction, in when it is not determined in the aforementioned Step S375 that a change in a item value has been received, a determination is made in Step S385 as to whether the UI display controller 25b has received a print execute instruction by means of the button. When in Step S385 it is determined that a print execute instruction has been received, the printing process is executed in Step S390.

Specifically, the print executor 25c outputs to print target data targeted for printing to the PRTDRV 21 corresponding to each printer registered as an aforementioned print target printer, as well as issuing instructions to the item value provisional setter 31 to set printing conditions. At this time, the item value provisional setter 31 accesses the software I/F 27 and sets printing condition item values recorded in the provisional settings 14a for the PRTDRV 21 corresponding to each aforementioned printer. As a result, each PRTDRV 21 carries out image processing according to printing conditions on the print target data as well as creating print data for executing printing according to printing conditions, outputs this to each print target printer, and executes printing.

Further, in the event that a print target printer is registered in such a way that printing of multiple copies will be executed by a given printer in the manner described earlier, the print executor 25c outputs multiple times print target data targeted for printing to a given PRTDRV 21 corresponding to the print target printer. Steps S350-S370 may be carried out subsequent to Step S385. In any event, by means of the above process printing by one model of printer can be executed in a reliable manner, while if item values for printing condition items are printable by a multiplicity of printers, multiple copies of a document or the like can be printed in a distributed manner by a multiplicity of printers, so that printing may be completed faster.

Additionally, a combination of both the aforementioned first embodiment for carrying out stylized operations and the aforementioned second embodiment able to carry out detailed settings in response to user instructions. For example, an arrangement whereby after stylized printing has been selected by means of a process analogous to that of the first embodiment, for printing condition items indicated by the user, user-preferred selection is made by a process analogous to that of the second embodiment, with settings for remaining printing condition items being carried out according to precedence.

Additionally, various arrangements other than those embodiments described above may be employed. For example, whereas in the preceding embodiments there is employed an arrangement whereby, prior to printing condition setting at least on the UI in computer 10, the resource DB 15c is created with reference to the printer DB 15b recorded on HDD 15, it would of course be possible instead to create the resource DB 15c in advance on a computer other than computer 10, and to record it on the HDD 15.

That is, it would be possible to employ an arrangement whereby the printer maker supplying the printer 40 creates the resource DB 15c in advance, and provides to the user of computer 10 a medium having recorded thereon a PRTDRV 21 program and resource DB 15c data, the resource DB 15c being recorded on the HDD 15 during installation of the PRTDRV 21. By means of this arrangement, there is no need to provide a printer DB 15b for creating a resource DB 15c on computer 10, whereby it is possible to hold down the data capacity required of the HDD 15. Additionally, since there is no need to create a resource DB 15c when the user is operating the computer, no time is needed for creation thereof, and the user need not be made to wait from the initial UI display.

On the other hand, in the arrangement described above wherein the resource DB 15c is created by referring to printer DB 15b recorded on HDD 15, since it is possible to easily rebuild the resource DB 15c in the event of a change in driver version or ink set as described above, it is a simple matter to accommodate changes in conditions. Also, even in the event that settable ranges cannot be acquired properly from the PRTDRV 21 due to an error or the like, since it is sufficient for appropriate settable range data to be recorded in printer DB 15b, in the event that such an error occurs it can be corrected easily.

The tiling of registration of settable range data in resource DB 15c is not limited to during building in the aforementioned Steps S115, S215 or during learning of settable range in Step S230; for example, predetermined settable range data could instead be registered after executing printing. That is, there is no need for correct values when used during preview of, for example, print area settings on the UI; if the data is of a sort for which correct values are needed at the time of printing, settable ranges therefor may be acquired when setting the print area in PRTDRV 21 at the time of printing, and recorded in the resource DB 15c. With such an arrangement, it is possible to prevent settings for the PRTDRV 21 from being made during UI display, so that the UI display process may be carried out faster; once the settable range data has been recorded in resource DB 15c, correct values can then be used rapidly.

Further, where character strings corresponding to item values are recorded together with item values as settable ranges for printing condition items in resource DB 15c as described above, it becomes possible to clearly indicate item values by means of text during display of settable ranges on the UI, so as to provide a UI that is easier to understand.

Further, whereas in the embodiments hereinabove the invention is implemented in a printer as the peripheral connected to a computer, the invention could of course also be implemented in any peripheral having working conditions settable by means of a UI. For example, the invention could be implemented in a display, projector, scanner, digital camera, hard disk drive, or the like. In the present invention, since appropriate settable ranges are identified by settable range data for working conditions with complex interdependencies, it is preferable to implement the invention in cases where numerous working conditions exist, or where peripherals have numerous dependency relationships. In this sense, a scanner or the like would be a favorable implementation example, or a multifunctional device combining a scanner, printer, copier and fax in a single unit would be a favorable implementation example.

Additionally, besides an arrangement implementing the invention in the case of multiple copy printing of a given print target as described above, the invention could also be implemented when printing different print targets in distributed fashion to a multiplicity of printers, or when carrying out a shared printing condition setting for different print targets, and carrying out printing according to this printing condition. By means of such arrangements, even where there are different print targets, the printing process can be completed faster than is the case when printing is executed with a single printer.

What is claimed is:

1. Peripheral control method for setting and controlling working conditions for peripherals, comprising:
storing in advance in a predetermined storage medium working environment data that identifies a working environment of a peripheral, the working environment data indicating conditions in which the peripheral is placed, dependency relationship data that indicates dependency relationships among said working conditions in that working environment to identify other working conditions which are associated with the working conditions, and settable range data that indicates settable ranges for said working conditions, and are usable when displaying a user interface for setting the working conditions for a peripheral in a given working environment;
a working condition input-output step wherein settings for each working condition are input, and settable ranges of said working conditions for a multiplicity of peripherals are acquired by referring to said settable range data, settable ranges within which said multiplicity of peripherals are settable in the current working environment are all made decision branches without duplication, and displayed on a predetermined output device;
a working condition update step wherein settable ranges of said multiplicity of peripherals are acquired for working conditions dependent on working conditions that have been modified by means of input of said settings with reference to said settable range data and dependency relationship data,
wherein by ascertaining dependency relationships among working conditions by the dependency relationship data, where such dependency relationship exists between the working conditions, preventing execution of a process to acquire settable ranges for working conditions having no dependency relationship, thus acquires the settable range data, and after said modify, settable ranges within which said multiplicity of peripherals are settable in the current working environment are all displayed as decision branches without duplication; and a peripheral control step wherein peripherals workable under working conditions at said handled input of settings are driven according to said working conditions.

2. Peripheral control method according to claim 1 wherein said peripheral is a printing device;

said peripheral control step comprises a print instruction handling step for handling an instruction for multiple copy printing of a print target; and when a multiple copy printing instruction is handled, print data for printing print targets under working conditions indicated by said settings is generated and transfened to a multiplicity of drive target printing devices to execute printing.

3. Peripheral control method for setting and controlling working conditions for peripherals, comprising:

storing in advance in a predetermined storage medium working environment data that identifies a working environment of a peripheral as well as a plurality of sets of stylized working data that specify working conditions for causing said peripherals to carry out stylized operations in that working environment;

a stylized working designation handling step wherein data indicating a plurality of stylized operations for a multiplicity of peripherals is acquired through reference to said stylized working data, stylized operation candidates to which said multiplicity of peripherals are settable in the current working environment are all displayed as decision branches without duplication, and displayed on a predetermined output device as well as handling instructions thereof; and a peripheral control step wherein peripherals able to perform said received stylized operation are driven in accordance with said stylized working data, wherein said peripheral is a printer, and said peripheral control step comprises a print instruction handling step for handling an instruction for multiple copy printing of a print target; and when a multiple copy printing instruction is received, print data for printing print targets under working conditions indicated by said settings is generated and transfened to a multiplicity of drive target printing devices to execute printing, wherein, while a stylized operation is carried out, settings are held as provisional settings until all required working condition settings have been determined, and after all required working conditions are determined, the provisional settings are set in each printer driver, thereby reducing the frequency of data exchange with the driver and holding down processing time.

* * * * *